(12) United States Patent
Lee

(10) Patent No.: US 10,997,069 B2
(45) Date of Patent: May 4, 2021

(54) MEMORY SYSTEM AND OPERATING METHOD THEREOF

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 91 days.

(21) Appl. No.: 16/389,449

(22) Filed: Apr. 19, 2019

(65) Prior Publication Data

US 2020/0097399 A1    Mar. 26, 2020

(30) Foreign Application Priority Data

Sep. 20, 2018    (KR) .................. 10-2018-0112758

(51) Int. Cl.
*G06F 12/02*    (2006.01)

(52) U.S. Cl.
CPC .. *G06F 12/0253* (2013.01); *G06F 2212/1044* (2013.01)

(58) Field of Classification Search
CPC ............. G06F 12/0246; G06F 12/0253; G06F 2212/1036; G06F 2212/1044; G06F 2212/7205; G06F 2212/7211
See application file for complete search history.

(56) References Cited

U.S. PATENT DOCUMENTS

2015/0261671 A1*   9/2015   Chu .................... G06F 12/0246
                                                            711/103

FOREIGN PATENT DOCUMENTS

| KR | 10-2014-0116387 | 10/2014 |
| KR | 10-2016-0096435 | 8/2016 |
| KR | 10-2016-0112529 | 9/2016 |

* cited by examiner

*Primary Examiner* — Yong J Choe
(74) *Attorney, Agent, or Firm* — IP & T Group LLP

(57) ABSTRACT

A memory system includes: a memory device including map memory blocks and data memory blocks; and a controller suitable to: detect, as victim memory blocks, map memory blocks each having an erase count less than or equal to an average erase count of the data memory blocks when an average erase count of the map memory blocks is less than the average erase count of the data memory blocks and a difference between the average erase count of the map memory blocks and the average erase count of the data memory blocks is greater than a first threshold; and perform a garbage collection operation on the detected first victim memory blocks, map data stored in hot data memory blocks to the first victim memory blocks, and map data stored in cold map memory blocks to the hot data memory blocks.

20 Claims, 14 Drawing Sheets

MEMORY SYSTEM AND OPERATING METHOD THEREOF

CROSS-REFERENCE TO RELATED APPLICATION

The present application claims priority of Korean Patent Application No. 10-2018-0112758, filed on Sep. 20, 2018, which is incorporated herein by reference in its entirety.

BACKGROUND

1. Field

Various embodiments of the present invention relate to a memory system and, more particularly, to a memory system capable of effectively performing a wear-leveling operation and an operating method thereof.

2. Description of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts, as compared with a hard disk device. Examples of memory systems having such advantages include universal serial bus (USB) memory devices, memory cards having various interfaces, and solid state drives (SSD).

SUMMARY

Various embodiments of the present invention are directed to a memory system capable of effectively performing a wear-leveling operation on a map memory block.

In an embodiment, a memory system may include: a memory device including map memory blocks for storing map data and data memory blocks for storing host data or system data; and a controller suitable to: detect, as first victim memory blocks, map memory blocks each having an erase count less than or equal to an average erase count of the data memory blocks when an average erase count of the map memory blocks is less than the average erase count of the data memory blocks and a difference between the average erase count of the map memory blocks and the average erase count of the data memory blocks is greater than a first threshold; and perform garbage collection operation on the detected first victim memory blocks, map data stored in hot data memory blocks, among the data memory blocks, to the first victim memory blocks, and map data stored in cold map memory blocks, among the map memory blocks, to the hot data memory blocks.

In an embodiment, an operating method of a memory system may include: detecting, as first victim memory blocks, map memory blocks each having an erase count less than or equal to an average erase count of data memory blocks when an average erase count of the map memory blocks is less than the average erase count of the data memory blocks and a difference between the average erase count of the map memory blocks and the average erase count of the data memory blocks is greater than a first threshold; and performing a garbage collection operation on the detected first victim memory blocks, mapping data stored in hot data memory blocks, among the data memory blocks, to the first victim memory blocks, and mapping data stored in cold map memory blocks, among the map memory blocks, to the hot data memory blocks.

In an embodiment, a memory system may include: a memory device including first memory blocks and second memory blocks; a controller suitable for: selecting, when a first average erase count of the first memory blocks is less than a second average erase count of the second memory blocks by an amount greater than a first threshold, a memory block having an erase count less than or equal to the second average erase count as a victim memory block; selecting, when a first average erase count of the first memory blocks is less than a second erase count of the second memory blocks by an amount less than or equal to the first threshold and greater than a second threshold, a memory block having a minimum erase count as the victim memory block; controlling the memory device to perform a garbage collection operation with the selected victim memory block; and controlling the memory device to map hot data stored in a third memory block among the second memory blocks to the victim memory block and map cold data stored in a fourth memory block among the first memory blocks to the third memory block.

DETAILED DESCRIPTION

Figure 1:
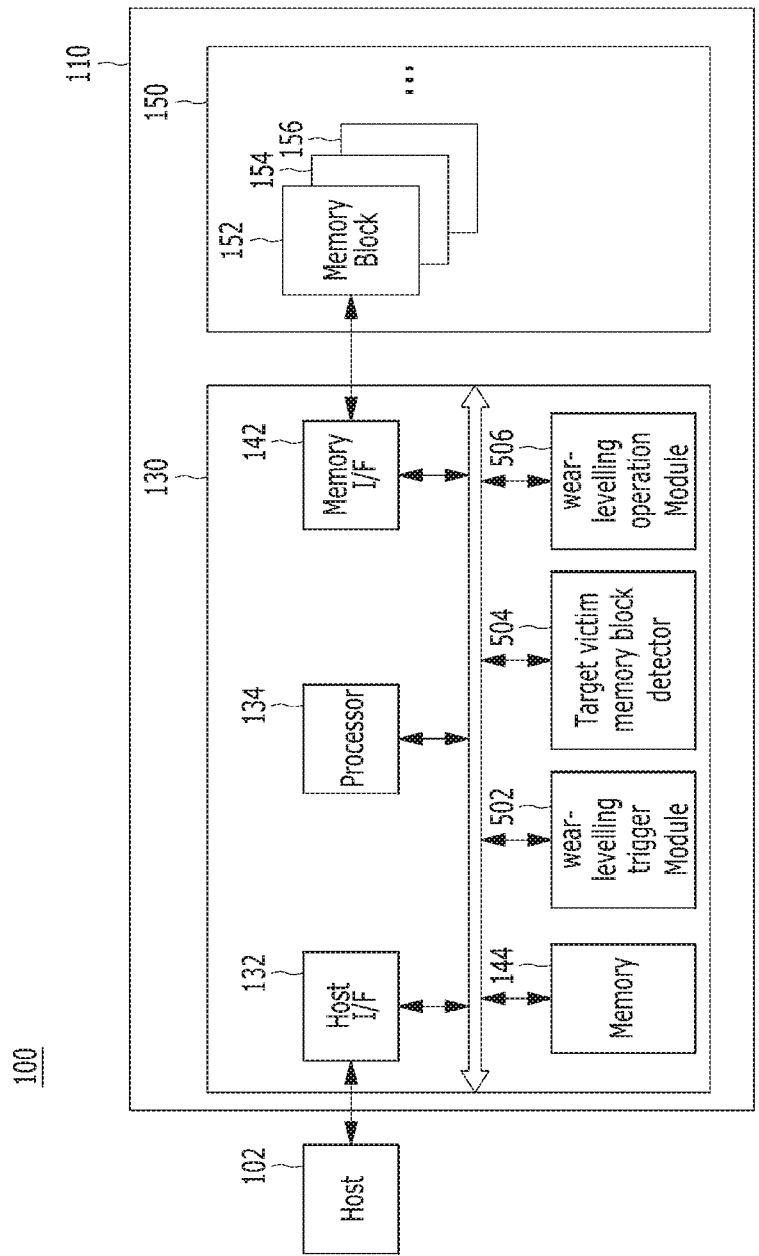
FIG. 1 is a block diagram illustrating a data processing system including a memory system in accordance with an embodiment of the present invention.

Various embodiments of the present invention will be described below in more detail with reference to the accompanying drawings. The present invention may, however, be embodied in different forms, which may be variations of any of the disclosed embodiments. Thus, the present invention is not limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention.

It is noted that reference to "an embodiment," "another embodiment" or the like does not necessarily mean only one embodiment, and different references to any such phrase are not necessarily to the same embodiment(s).

It will be understood that, although the terms "first" and/or "second" may be used herein to identify various elements, these elements should not be limited by these terms. These terms are only used to distinguish one element from another element that otherwise have the same or similar names. For instance, a first element in one instance could be termed a second element in another instance, and vice versa, without departing from the teachings of the present disclosure.

It will be understood that when an element is referred to as being "coupled" or "connected" to another element, it can be directly coupled or connected to the other element or one or more intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way. Communication between two elements, whether directly or indirectly connected/coupled, may be wired or wireless, unless the context indicates otherwise.

The terminology used herein is for the purpose of describing particular embodiments only and is not intended to be limiting. In the present disclosure, the singular forms are intended to include the plural forms and vice versa, unless the context clearly indicates otherwise. The articles 'a' and 'an' as used in this application and the appended claims should generally be construed to mean 'one or more' unless specified otherwise or clear from context to be directed to a singular form. It will be further understood that the terms "comprise", "include", "have", and any other open-ended transition terms, when used in this specification, specify the presence of stated features, numbers, steps, operations, elements, components, and/or combinations of them but do not preclude the presence or addition of one or more other features, numbers, steps, operations, elements, components, and/or combinations thereof.

The above-described embodiments are merely for the purpose of understanding the present invention, not to limit the scope of the invention. Various modifications may be made to any of the above-described embodiments as one skilled in the relevant art will understand from the present disclosure.

Unless otherwise defined, all terms including technical and scientific terms used herein have the same meaning as commonly understood by one of ordinary skill in the art to which the present disclosure pertains. Unless otherwise defined in the present disclosure, the terms should not be construed as overly ideal or excessively formal.

Various embodiments of the present invention will be described in detail now with reference to the attached drawings.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include at least one OS (operating system). The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include any of various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, and an UFS device. The memory system 110 may be configured as a part of a computer, a smart phone, a portable game player, or one of various components configuring a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The structure of the memory device 150 including a 3D stack structure of the memory device 150 will be described in detail below with reference to FIGS. 2 to 4.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

More specifically, the controller 130 may include a host interface (I/F) 132, a processor 134, a memory interface 142, and a memory 144, all operatively coupled or engaged via an internal bus. As described later with reference to FIG. 5, the controller 130 may further include a wear-leveling trigger module 502, a target victim memory block detector 504 and a wear-leveling operation module 506.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface 132 may be driven via firmware, that is, a host interface layer (HIL) for exchanging data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In another embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data to perform data write and read operations between the host 102 and the memory device 150 and other data required for the controller 130 and the memory device 150 to perform these operations.

The processor 134 may control overall operations of the memory system 110. The processor 134 may use firmware to control the overall operations of the memory system 110. The firmware may be referred to as flash translation layer (FTL). The processor 134 may be implemented with a microprocessor or a central processing unit (CPU).

For example, the controller 130 may perform an operation requested by the host 102 in the memory device 150 through the processor 134, which is implemented as a microprocessor, a CPU, or the like. Also, the controller 130 may perform a background operation on the memory device 150 through the processor 134, which may be realized as a microprocessor or a CPU. The background operation performed on the memory device 150 may include an operation of copying and processing data stored in some memory blocks among the memory blocks 152 to 156 of the memory device 150 into other memory blocks, e.g., a garbage collection (GC) operation, an operation of performing swapping data between some of the memory blocks 152 to 156, e.g., a wear-leveling (WL) operation, an operation of storing the map data stored in the controller 130 in the memory blocks 152 to 156, e.g., a map flush operation, or an operation of managing bad blocks of the memory device 150, e.g., a bad block management operation of detecting and processing bad blocks among the memory blocks 152 to 156 in the memory device 150.

The memory device of the memory system in accordance with an embodiment of the present invention is described in detail with reference to FIGS. 2 to 4.

Figure 2:
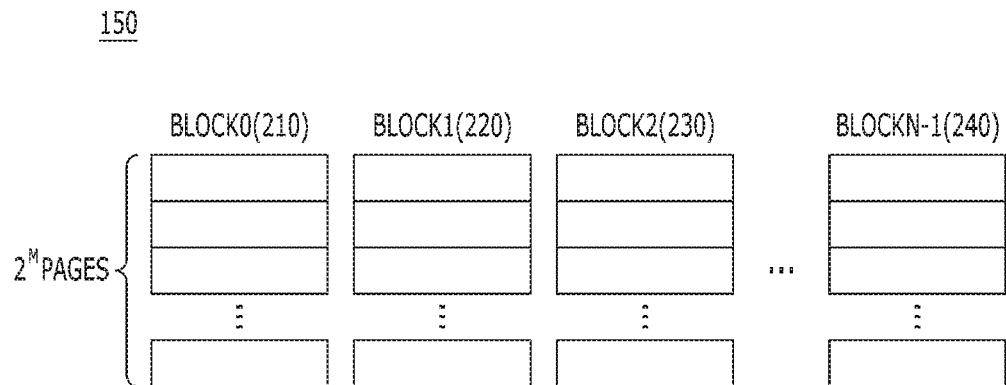
FIG. 2 is a schematic diagram illustrating a configuration of a memory device employed in the memory system shown in FIG. 1.

FIG. 2 is a schematic diagram illustrating the memory device 150. FIG. 3 is a circuit diagram illustrating a configuration of a memory cell array of a memory block 330 in the memory device 150. FIG. 4 is a schematic diagram illustrating a 3D structure of the memory device 150.

Referring to FIG. 2, the memory device 150 may include a plurality of memory blocks BLOCK0 to BLOCKN−1, where N is an integer greater than 1. Each of the blocks BLOCK0 to BLOCKN−1 may include a plurality of pages, for example, $2^M$ or M pages, the number of which may vary according to circuit design, M being an integer greater than 1. Each of the pages may include a plurality of memory cells that are coupled to a plurality of word lines WL.

Also, memory cells in the respective memory blocks BLOCK0 to BLOCKN−1 may be one or more of a single level cell (SLC) storing 1-bit data or a multi-level cell (MLC) storing 2- or more bit data. Hence, the memory device 150 may include SLC memory blocks or MLC memory blocks, depending on the number of bits which can be expressed or stored in each of the memory cells in the memory blocks. The SLC memory blocks may include a plurality of pages which are embodied by memory cells, each storing one-bit data. The SLC memory blocks may generally have higher data computing performance and higher durability than the MLC memory blocks. The MLC memory blocks may include a plurality of pages which are embodied by memory cells each storing multi-bit data (for example, 2 or more bits). The MLC memory blocks may generally have larger data storage space, that is, higher integration density, than the SLC memory blocks. In another embodiment, the memory device 150 may include a plurality of triple level cell (TLC) memory blocks. In yet another embodiment, the memory device 150 may include a plurality of quadruple level cell (QLC) memory blocks. The TCL memory blocks may include a plurality of pages which are embodied by memory cells each capable of storing 3-bit data. The QLC memory blocks may include a plurality of pages which are embodied by memory cells each capable of storing 4-bit data.

Instead of a nonvolatile memory, the memory device 150 may be implemented by any one of a phase change random access memory (PCRAM), a resistive random access memory (RRAM(ReRAM)), a ferroelectrics random access memory (FRAM), and a spin transfer torque magnetic random access memory (STT-RAM(STT-MRAM)).

The memory blocks 210, 220, 230, 240 may store the data transferred from the host 102 through a program operation, and may transfer data stored therein to the host 102 through a read operation.

Figure 3:
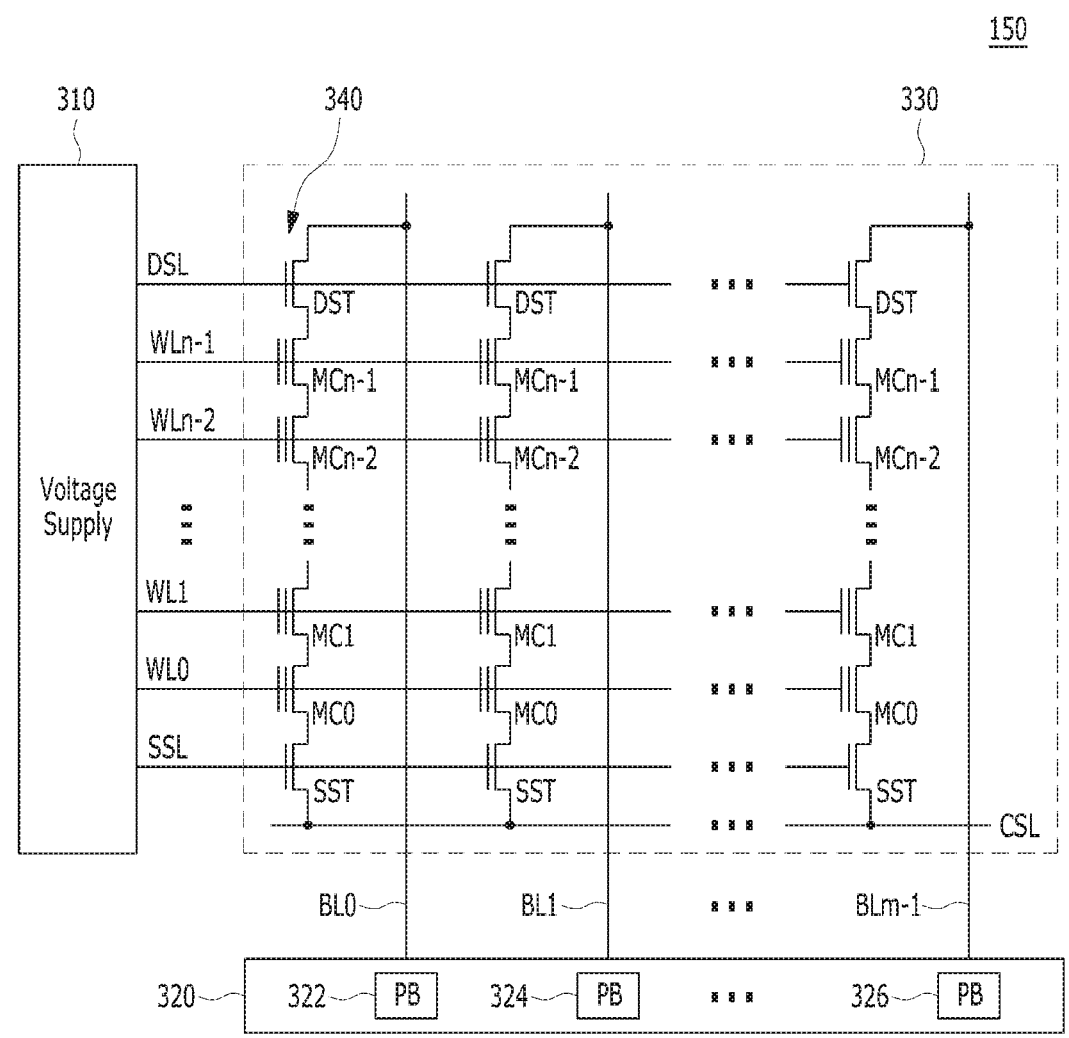
FIG. 3 is a circuit diagram illustrating a configuration of a memory cell array of a memory block in the memory device shown in FIG. 1.
Figure 4:
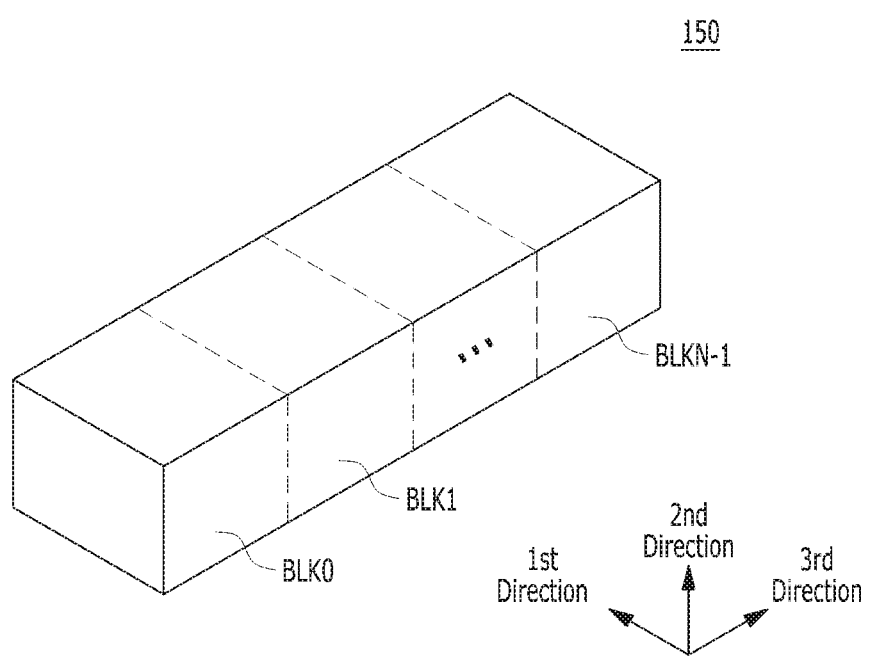
FIG. 4 is a block diagram illustrating a structure of a memory device of a memory system in accordance with an embodiment of the present invention.

Referring to FIG. 3, the memory block 330 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the present disclosure is not limited thereto. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select at least one of the memory blocks (or sectors) of the memory cell array, select at least one of the word lines of the selected memory block, and provide the word line voltages to the selected word line(s) and the unselected word lines as may be needed.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive data to be stored into the memory cell array from a buffer (not illustrated), and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied by a 2D or 3D memory device. Particularly, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1, which may correspond to the memory blocks 152, 154 and 156 of the memory device 150 shown in FIG. 1. Each of the memory blocks 152, 154 and 156 may be realized in a 3D structure (or vertical structure). For example, each of the memory blocks 152, 154 and 156, as well as the collective structure, may be three-dimensional with dimensions extending in mutually orthogonal directions, e.g., an x-axis direction, a y-axis direction, and a z-axis direction, as shown in FIG. 4.

Each memory block 330 included in the memory device 150 may include a plurality of NAND strings NS (not shown) that are extended in the second direction, and a plurality of NAND strings NS that are extended in the first direction and the third direction. Herein, each of the NAND strings NS may be coupled to a bit line BL, at least one string select line SSL, at least one ground select line GSL (not shown), a plurality of word lines WL, at least one dummy word line DWL (not shown), and a common source line CSL, and each of the NAND strings NS may include a plurality of transistor structures TS (not shown).

In short, each memory block 330, which is representative of any of the memory blocks 152, 154 and 156 of the memory device 150, may be coupled to a plurality of bit lines BL, a plurality of string select lines SSL, a plurality of ground select lines GSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a string select transistor SST of each NAND string NS may be coupled to a corresponding bit line BL, and a ground select transistor GST of each NAND string NS may be coupled to a common source line CSL. Herein, memory cells MC may be provided between the string selection transistor SST and the ground select transistor GST of each NAND string NS. In other words, a plurality of memory cells may be realized in each memory block 330 of the memory device 150.

A flash memory device performs program and read operations by units of pages, performs an erase operation by units of memory blocks and does not support the overwrite operation, which is different from the hard disk system. Therefore, in order to change original data programmed in a page, the flash memory device programs changed version of the original data into another page and invalidates the original data. When a particular memory block is full of invalid pages, the controller 130 may control the memory device 150 to perform an erase operation on the particular memory block and then perform a program operation on the particular (now erased) memory block. When an erase count of the particular memory block reaches a maximum erase count, the controller 130 may designate the particular memory block as a bad memory block, which cannot be used anymore. The controller 130 may control the memory device 150 to perform a wear-leveling operation on a memory block such that the erase count of the memory block does not reach the maximum erase count. Through the wear-leveling operation, the wear-levels of memory blocks included in the memory device 150 may be kept uniform thereby increasing the lifetime of the flash memory.

During the wear-leveling operation, data programmed in a memory block having a high erase count may be mapped to a memory block having a low erase count while data programmed in a memory block having a low erase count may be mapped to a memory block having a high erase count. Through the wear-leveling operation, the frequency of program and erase operations on the memory block having a low erase count may increase while the frequency of program and erase operations on the memory block having a high erase count may decrease. Through the wear-leveling operation, the wear-levels of memory blocks in the memory device 150 may be kept uniform thereby increasing the lifetime of the flash memory.

According to prior art, a controller controls a memory device to separately perform the wear-leveling operation on a map memory block storing map data and a data memory block storing system data and host data. For example, during the wear-leveling operation on the map memory block, the controller detects the map memory block having a low erase count and the map memory block having a high erase count, and maps map data programmed in the map memory block having a high erase count to the map memory block having a low erase count while mapping map data programmed in the map memory block having a low erase count to the map memory block having a high erase count.

According to the prior art, it is hard to maintain the wear-levels of all memory blocks including both the map memory blocks and the data memory blocks uniform when program and erase operations are intensively performed on both map memory blocks and data memory blocks. For example, when program and erase operations are more intensively performed on the data memory blocks than on the map memory blocks, the average erase count of the data memory blocks is high while the average erase count of the map memory blocks is low. In this case, it is hard to maintain the wear-levels of all memory blocks including both the map memory blocks and the data memory blocks uniform, although the wear-levels of the data memory blocks can be kept uniform through the wear-leveling operation on the data memory blocks.

For example, when program and erase operations are more intensively performed on the map memory blocks than the data memory blocks, the average erase count of the map memory blocks is high while the average erase count of the data memory blocks is low. In this case, it is hard to maintain the wear-levels of all memory blocks including both the map memory blocks and the data memory blocks uniform, although the wear-levels of the map memory blocks can be kept uniform through the wear-leveling operation on the map memory blocks.

In accordance with an embodiment of the present disclosure, when program and erase operations are more intensively performed on the data memory blocks than on the map memory blocks, the map memory blocks having a low erase count may be changed to become the data memory blocks. The controller 130 may perform the wear-leveling operation of mapping data programmed in the data memory blocks having a high erase count to the changed data memory blocks. In accordance with another embodiment of the present disclosure, when program and erase operations are more intensively performed on the map memory blocks than on the data memory blocks, the data memory blocks having a low erase count may be changed to become the map memory blocks. The controller 130 may perform the wear-leveling operation of mapping data programmed in the map memory blocks having a high erase count to the changed map memory blocks. In accordance with an embodiment of the present disclosure, the wear-leveling operation may be performed on the map memory block and the data memory block not separately but in the aggregate thereby keeping the wear-levels of all memory blocks including the map memory block and the data memory block uniform.

Figure 5:
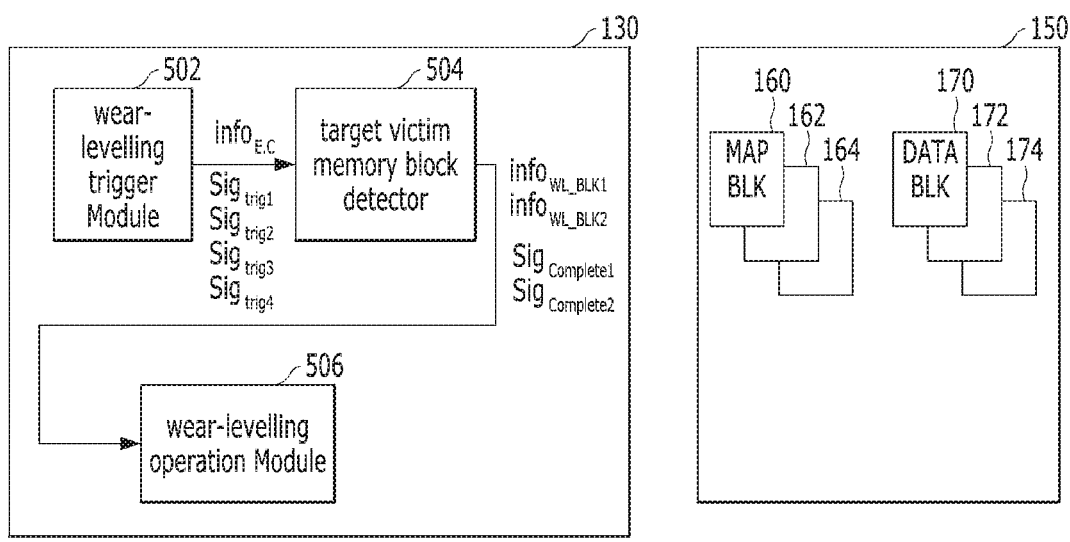
FIG. 5 is a block diagram schematically illustrating a memory system in accordance with an embodiment of the present disclosure.

FIG. 5 is a block diagram schematically illustrating the memory system 110 in accordance with an embodiment of the present disclosure. FIG. 5 briefly illustrates elements related to an embodiment of the present disclosure among the elements of the data processing system 100.

As described above the memory system 110 may include the memory device 150 and the controller 130. The controller 130 may control the memory device 150 to perform the wear-leveling operation and the garbage collection operation on the memory blocks.

Referring to FIG. 5, the controller 130 may further include the wear-leveling trigger module 502, the target victim memory block detector 504 and the wear-leveling operation module 506. The memory device 150 may include a plurality of map memory blocks 160, 162 and 164 and data memory blocks 170, 172 and 174.

The wear-leveling trigger module 502 may trigger a target victim memory block detection operation based on difference between the average erase count $EC_{AVG\_MAP}$ of the map memory blocks and the average erase count $EC_{AVG\_DATA}$ of the data memory blocks.

In accordance with an embodiment of the present disclosure, the wear-leveling trigger module 502 may provide the target victim memory block detector 504 with a first trigger signal $Sig_{trig1}$ when the average erase count $EC_{AVG\_MAP}$ of the map memory blocks is less than the average erase count $EC_{AVG\_DATA}$ of the data memory blocks and the difference between the average erase count $EC_{AVG\_MAP}$ of the map memory blocks and the average erase count $EC_{AVG\_DATA}$ of the data memory blocks is greater than a first threshold $TH_1$.

The wear-leveling trigger module 502 may provide the g target victim memory block detector 504 with a second trigger signal $Sig_{trig2}$ when the average erase count $EC_{AVG\_MAP}$ of the map memory blocks is less than the average erase count $EC_{AVG\_DATA}$ of the data memory blocks and the difference between the average erase count $EC_{AVG\_MAP}$ of the map memory blocks and the average erase count $EC_{AVG\_DATA}$ of the data memory blocks is less than or equal to the first threshold $TH_1$ but the difference between the minimum erase count $EC_{Min\_MAP}$ of the map memory blocks and the average erase count $EC_{AVG\_DATA}$ of the data memory blocks is greater than a second threshold $TH_2$.

In accordance with another embodiment of the present disclosure, the wear-leveling trigger module 502 may provide the target victim memory block detector 504 with a third trigger signal $Sig_{trig3}$ when the average erase count $EC_{AVG\_DATA}$ of the data memory blocks is less than the average erase count $EC_{AVG\_MAP}$ of the map memory blocks and the difference between the average erase count $EC_{AVG\_MAP}$ of the map memory blocks and the average erase count $EC_{AVG\_DATA}$ of the data memory blocks is greater than the first threshold $TH_1$.

The wear-leveling trigger module 502 may provide the target victim memory block detector 504 with a fourth trigger signal $Sig_{trig4}$ when the average erase count $EC_{AVG\_DATA}$ of the data memory blocks is less than the average erase count $EC_{AVG\_MAP}$ of the map memory blocks and the difference between the average erase count $EC_{AVG\_MAP}$ of the map memory blocks and the average erase count $EC_{AVG\_DATA}$ of the data memory blocks is less than or equal to the first threshold $TH_1$ but the difference between the minimum erase count $EC_{Min\_DATA}$ of the data memory blocks and the average erase count $EC_{AVG\_MAP}$ of the map memory blocks is greater than the second threshold $TH_2$.

Figure 6:
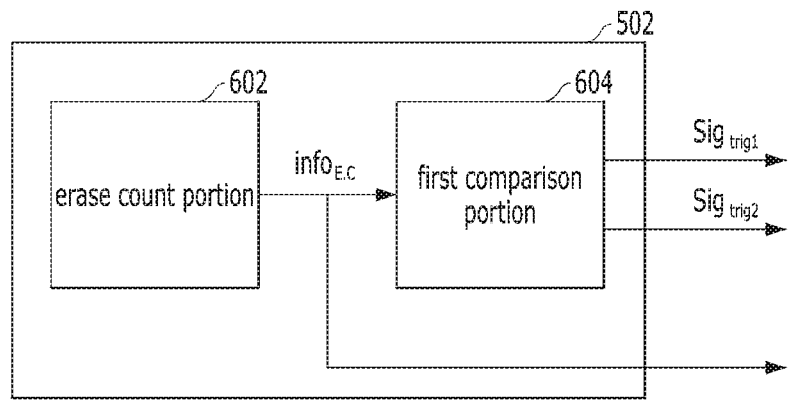
FIG. 6 is a block diagram schematically illustrating a wear-leveling trigger module in accordance with an embodiment of the present disclosure.

FIG. 6 is a block diagram schematically illustrating the wear-leveling trigger module 502 in accordance with an embodiment of the present disclosure.

The wear-leveling trigger module 502 may include an erase count portion 602 and a first comparison portion 604.

The erase count portion 602 may obtain the average erase count $EC_{AVG\_MAP}$ of the map memory blocks and the average erase count $EC_{AVG\_DATA}$ of the data memory blocks.

The erase count portion 602 may obtain the erase counts of the respective map memory blocks and the erase counts of the respective data memory blocks within the memory device 150. The erase count portion 602 may obtain the average erase count $EC_{AVG\_MAP}$ of the map memory blocks by summing the erase counts of the respective map memory blocks and then dividing that sum by the number of the map memory blocks. The erase count portion 602 may obtain the average erase count $EC_{AVG\_DATA}$ of the data memory blocks by summing the erase counts of the respective data memory blocks and then dividing that sum by the number of the data memory blocks.

The erase count portion 602 may provide the first comparison portion 604 and the target victim memory block detector 504 with the erase count information $info_{EC}$ representing the average erase count $EC_{AVG\_MAP}$ of the map memory blocks and the average erase count $EC_{AVG\_DATA}$ of the data memory blocks, and the erase counts of the respective map memory blocks and the erase counts of the respective data memory blocks within the memory device 150.

The first comparison portion 604 may compare the average erase count $EC_{AVG\_MAP}$ of the map memory blocks and the average erase count $EC_{AVG\_DATA}$ of the data memory blocks based on the erase count information $info_{EC}$.

In accordance with an embodiment of the present disclosure, the first comparison portion 604 may provide the target victim memory block detector 504 with the first trigger signal $Sig_{trig1}$ when the average erase count $EC_{AVG\_MAP}$ of the map memory blocks is less than the average erase count $EC_{AVG\_DATA}$ of the data memory blocks and the difference between the average erase count $EC_{AVG\_MAP}$ of the map memory blocks and the average erase count $EC_{AVG\_DATA}$ of the data memory blocks is greater than a first threshold $TH_1$.

The first comparison portion 604 may obtain the minimum erase count $EC_{Min\_MAP}$ of the map memory blocks when the average erase count $EC_{AVG\_MAP}$ of the map memory blocks is less than the average erase count $EC_{AVG\_DATA}$ of the data memory blocks and the difference between the average erase count $EC_{AVG\_MAP}$ of the map memory blocks and the average erase count $EC_{AVG\_DATA}$ of the data memory blocks is less than or equal to the first threshold $TH_1$. The first comparison portion 604 may obtain the minimum erase count $EC_{Min\_MAP}$ of the map memory blocks from the erase counts of the map memory blocks within the memory device 150 according to the erase count information $info_{EC}$.

The first comparison portion 604 may provide the target victim memory block detector 504 with the second trigger signal $Sig_{trig2}$ when the average erase count $EC_{AVG\_MAP}$ of the map memory blocks is less than the average erase count $EC_{AVG\_DATA}$ of the data memory blocks and the difference between the average erase count $EC_{AVG\_MAP}$ of the map memory blocks and the average erase count $EC_{AVG\_DATA}$ of the data memory blocks is less than or equal to the first threshold $TH_1$ but the difference between the minimum erase count $EC_{Min\_MAP}$ of the map memory blocks and the average erase count $EC_{AVG\_DATA}$ of the data memory blocks is greater than a second threshold $TH_2$.

The wear-leveling trigger module 502 may control the memory device 150 to preferentially perform the wear-leveling operation on the map memory block having the minimum erase count $EC_{Min\_MAP}$ by triggering the wear-leveling operation under a particular condition (i.e., when the difference between the minimum erase count $EC_{Min\_MAP}$ of the map memory blocks and the average erase count $EC_{AVG\_DATA}$ of the data memory blocks is greater than a second threshold $TH_2$) even when the average erase count $EC_{AVG\_MAP}$ of the map memory blocks is less than the average erase count $EC_{AVG\_DATA}$ of the data memory blocks and the difference between the average erase count $EC_{AVG\_MAP}$ of the map memory blocks and the average erase count $EC_{AVG\_DATA}$ of the data memory blocks is less than or equal to the first threshold $TH_1$.

Therefore, the wear-leveling trigger module 502 may prevent a problem in which the wear-leveling operation is not performed for a long time on the map memory block having the minimum erase count $EC_{Min\_MAP}$ due to a long-time situation in which the average erase count $EC_{AVG\_MAP}$ of the map memory blocks is less than the average erase count $EC_{AVG\_DATA}$ of the data memory blocks and the difference between the average erase count $EC_{AVG\_MAP}$ of the map memory blocks and the average erase count $EC_{AVG\_DATA}$ of the data memory blocks is less than or equal to the first threshold $TH_1$.

Figure 7:
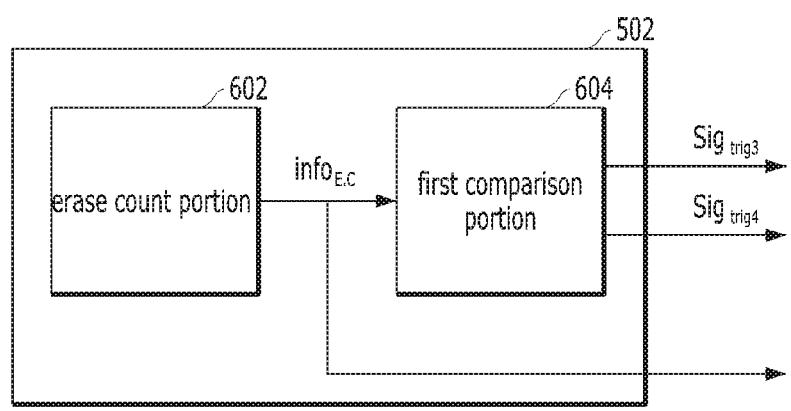
FIG. 7 is a block diagram schematically illustrating a wear-leveling trigger module in accordance with another embodiment of the present disclosure.

FIG. 7 is a block diagram schematically illustrating the wear-leveling trigger module 502 in accordance with another embodiment of the present disclosure.

In accordance with another embodiment of the present disclosure, the first comparison portion 604 may provide the target victim memory block detector 504 with the third trigger signal $Sig_{trig3}$ when the average erase count $EC_{AVG\_DATA}$ of the data memory blocks is less than the average erase count $EC_{AVG\_MAP}$ of the map memory blocks and the difference between the average erase count $EC_{AVG\_MAP}$ of the map memory blocks and the average erase count $EC_{AVG\_DATA}$ of the data memory blocks is greater than the first threshold $TH_1$.

The first comparison portion 604 may obtain the minimum erase count $EC_{Min\_DATA}$ of the data memory blocks when the average erase count $EC_{AVG\_DATA}$ of the data memory blocks is less than the average erase count $EC_{AVG\_MAP}$ of the map memory blocks and the difference between the average erase count $EC_{AVG\_MAP}$ of the map memory blocks and the average erase count $EC_{AVG\_DATA}$ of the data memory blocks is less than or equal to the first threshold $TH_1$. The first comparison portion 604 may obtain the minimum erase count $EC_{Min\_DATA}$ of the data memory blocks from the erase counts of the data memory blocks within the memory device 150 according to the erase count information $info_{EC}$.

The first comparison portion 604 may provide the target victim memory block detector 504 with the fourth trigger signal $Sig_{trig4}$ when the average erase count $EC_{AVG\_DATA}$ of the data memory blocks is less than the average erase count $EC_{AVG\_MAP}$ of the map memory blocks and the difference between the average erase count $EC_{AVG\_MAP}$ of the map memory blocks and the average erase count $EC_{AVG\_DATA}$ of the data memory blocks is less than or equal to the first threshold $TH_1$ but the difference between the minimum erase count $EC_{Min\_DATA}$ of the data memory blocks and the average erase count $EC_{AVG\_MAP}$ of the map memory blocks is greater than the second threshold $TH_2$.

The wear-leveling trigger module 502 may control the memory device 150 to preferentially perform the wear-leveling operation on the data memory block having the minimum erase count $EC_{Min\_DATA}$ by triggering the wear-leveling operation under a particular condition (i.e., when the difference between the minimum erase count $EC_{Min\_DATA}$ of the data memory blocks and the average erase count $EC_{AVG\_MAP}$ of the map memory blocks is greater than the second threshold $TH_2$) even when the average erase count $EC_{AVG\_DATA}$ of the data memory blocks is less than the average erase count $EC_{AVG\_MAP}$ of the map memory blocks and the difference between the average erase count $EC_{AVG\_MAP}$ of the map memory blocks and the average erase count $EC_{AVG\_DATA}$ of the data memory blocks is less than or equal to the first threshold $TH_1$.

Therefore, the wear-leveling trigger module 502 may prevent a problem that the wear-leveling operation is not performed for a long time on the data memory block having the minimum erase count $EC_{Min\_DATA}$ due to a long-time situation that the average erase count $EC_{AVG\_DATA}$ of the data memory blocks is less than the average erase count $EC_{AVG\_MAP}$ of the map memory blocks and the difference between the average erase count $EC_{AVG\_MAP}$ of the map memory blocks and the average erase count $EC_{AVG\_DATA}$ of the data memory blocks is less than or equal to the first threshold $TH_1$.

Referring back to FIG. 5, in accordance with an embodiment of the present disclosure, the target victim memory block detector 504 may detect first victim memory blocks according to the first trigger signal $Sig_{trig1}$ and the second trigger signal $Sig_{trig2}$. The target victim memory block detector 504 may detect as the first victim memory blocks the map memory blocks having erase counts, each of which is less than or equal to the average erase count $EC_{AVG\_DATA}$ of the data memory blocks according to the first trigger signal $Sig_{trig1}$. The target victim memory block detector 504 may further detect as the first victim memory block the map memory block having the minimum erase count $EC_{Min\_MAP}$ of the map memory blocks according to the second trigger signal $Sig_{trig2}$.

In accordance with another embodiment of the present disclosure, the target victim memory block detector 504 may detect second victim memory blocks according to the third trigger signal $Sig_{trig3}$ and the fourth trigger signal $Sig_{trig4}$. The target victim memory block detector 504 may detect as the second victim memory blocks the data memory blocks having erase counts, each of which is less than or equal to the average erase count $EC_{AVG\_MAP}$ of the map memory blocks according to the third trigger signal $Sig_{trig3}$. The target victim memory block detector 504 may further detect as the second victim memory block the data memory block having the minimum erase count $EC_{Min\_DATA}$ of the data memory blocks according to the fourth trigger signal $Sig_{trig4}$.

In accordance with an embodiment of the present disclosure, the target victim memory block detector 504 may control the memory device 150 to perform a garbage collection operation of copying valid page data of the first victim memory blocks into target map memory blocks and erasing data of the first victim memory blocks. The target victim memory block detector 504 may provide the wear-leveling operation module 506 with information $info_{WL\_BLK1}$ about the first victim memory blocks and a first complete signal $Sig_{complete1}$.

In accordance with another embodiment of the present disclosure, the target victim memory block detector 504 may control the memory device 150 to perform a garbage collection operation of copying valid page data of the second victim memory blocks into target map memory blocks and erasing data of the second victim memory blocks. The target victim memory block detector 504 may provide the wear-leveling operation module 506 with information $info_{WL\_BLK2}$ about the second victim memory blocks and a second complete signal $Sig_{complete2}$.

Figure 8:
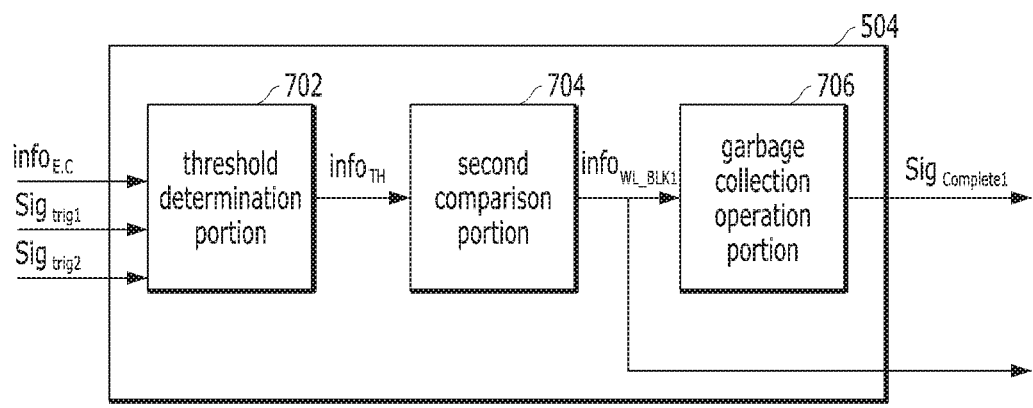
FIG. 8 is a block diagram schematically illustrating a target victim memory block detector in accordance with an embodiment of the present disclosure.

FIG. 8 is a block diagram schematically illustrating the target victim memory block detector 504 in accordance with an embodiment of the present disclosure.

The target victim memory block detector 504 may include a threshold determination portion 702, a second comparison portion 704 and a garbage collection operation portion 706.

The threshold determination portion 702 may determine as thresholds TH the average erase count $EC_{AVG\_DATA}$ of the data memory blocks and the minimum erase count $EC_{Min\_MAP}$ of the map memory blocks according to the first trigger signal $Sig_{trig1}$ and the second trigger signal $Sig_{trig2}$, respectively. The threshold determination portion 702 may provide the second comparison portion 704 with threshold information $info_{TH}$ representing the determined thresholds TH.

The second comparison portion 704 may compare the thresholds TH with the erase counts of the respective map memory blocks according to the threshold information $info_{TH}$. In accordance with an embodiment of the present disclosure, the second comparison portion 704 may detect as the first victim memory blocks the map memory blocks having the erase counts less than or equal to the thresholds TH. The second comparison portion 704 may provide the garbage collection operation portion 706 and the wear-leveling operation module 506 with the information $info_{WL\_BLK1}$ about the detected first victim memory blocks.

The garbage collection operation portion 706 may control the memory device 150 to perform a garbage collection operation on the first victim memory blocks according to the information $info_{WL\_BLK1}$ about the first victim memory blocks. During the garbage collection operation, the memory device 150 may copy valid page data of the first victim memory blocks into target map memory blocks and may erase data of the first victim memory blocks. Each target memory block may have empty pages, a number of which is greater than or equal to a threshold, which may be predetermined. When all pages of the first victim memory blocks become empty due to the garbage collection operation, the garbage collection operation portion 706 may provide the wear-leveling operation module 506 with the first complete signal $Sig_{complete1}$.

Figure 9:
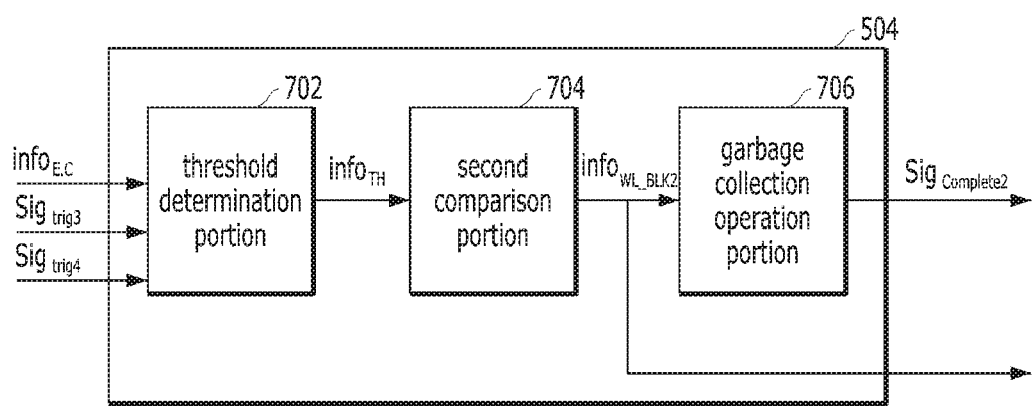
FIG. 9 is a block diagram schematically illustrating a target its victim memory block detector in accordance with another embodiment of the present disclosure.

FIG. 9 is a block diagram schematically illustrating the target victim memory block detector 504 in accordance with another embodiment of the present disclosure.

The threshold determination portion 702 may determine as thresholds TH the average erase count $EC_{AVG\_MAP}$ of the map memory blocks and the minimum erase count $EC_{Min\_DATA}$ of the data memory blocks according to the third trigger signal $Sig_{trig3}$ and the fourth trigger signal $Sig_{trig4}$, respectively. The threshold determination portion 702 may provide the second comparison portion 704 with threshold information $info_{TH}$ representing the determined thresholds TH.

The second comparison portion 704 may compare the thresholds TH with the erase counts of the respective data memory blocks according to the threshold information $info_{TH}$. In accordance with another embodiment of the present disclosure, the second comparison portion 704 may detect as the second victim memory blocks the data memory blocks having the erase counts less than or equal to the thresholds TH. The second comparison portion 704 may provide the garbage collection operation portion 706 and the wear-leveling operation module 506 with the information $info_{WL\_BLK2}$ about the detected second victim memory blocks.

The garbage collection operation portion 706 may control the memory device 150 to perform a garbage collection operation on the second victim memory blocks according to the information $info_{WL\_BLK2}$ about the second victim memory blocks. During the garbage collection operation, the memory device 150 may copy valid page data of the second victim memory blocks into target data memory blocks and may erase data of the second victim memory blocks. Each target memory block may have empty pages, a number of which is greater than or equal to a threshold, which may be predetermined. When all pages of the second victim memory blocks become empty due to the garbage collection operation, the garbage collection operation portion 706 may provide the wear-leveling operation module 506 with the second complete signal $Sig_{complete2}$.

Referring back to FIG. 5, the wear-leveling operation module 506 may control the memory device 150 to perform a wear-leveling operation to the victim memory blocks according to the first complete signal $Sig_{complete1}$ and the second complete signal $Sig_{complete2}$.

In accordance with an embodiment of the present disclosure, the wear-leveling operation module 506 may detect as hot data memory blocks the data memory blocks each having the erase count equal to or greater than a threshold, which may be predetermined, according to the first complete signal $Sig_{complete1}$. The hot data memory blocks may be those storing hot data, which is data that is frequently accessed, i.e., has a high frequency of access. The wear-leveling operation module 506 may control the memory device 150 to perform a wear-leveling operation of mapping data stored in the hot data memory blocks to the first victim memory blocks based on the information $info_{WL\_BLK1}$ about the first victim memory blocks.

In accordance with an embodiment of the present disclosure, the controller 130 may control the memory device 150 to perform a wear-leveling operation on the map memory block and the data memory block not separately but in the aggregate by changing the map memory block to the data memory block through a garbage collection operation and a mapping operation. The controller 130 may prevent a problem in which the erase count of the map memory block does not increase by controlling the memory device 150 to perform a wear-leveling operation of mapping the hot data stored in the data memory block to the map memory block having a low erase count. Therefore, the erase counts of all the memory blocks may be kept uniform within the memory device 150.

In accordance with another embodiment of the present disclosure, the wear-leveling operation module 506 may detect as hot map memory blocks the map memory blocks each having the erase count greater than or equal to a threshold, which may be predetermined, according to the second complete signal $Sig_{complete2}$. The wear-leveling operation module 506 may control the memory device 150 to perform a wear-leveling operation of mapping data stored in the hot map memory blocks to the second victim memory blocks based on the information $info_{WL\_BLK2}$ about the second victim memory blocks.

In accordance with another embodiment of the present disclosure, the controller 130 may control the memory device 150 to perform a wear-leveling operation on the map memory block and the data memory block not separately but in the aggregate by changing the data memory block to the map memory block through a garbage collection operation and a mapping operation. The controller 130 may prevent a problem in which the erase count of the data memory block does not increase by controlling the memory device 150 to perform a wear-leveling operation of mapping the hot data stored in the map memory block to the data memory block having a low erase count. Therefore, the erase counts of all the memory blocks may be kept uniform within the memory device 150.

Figure 10:
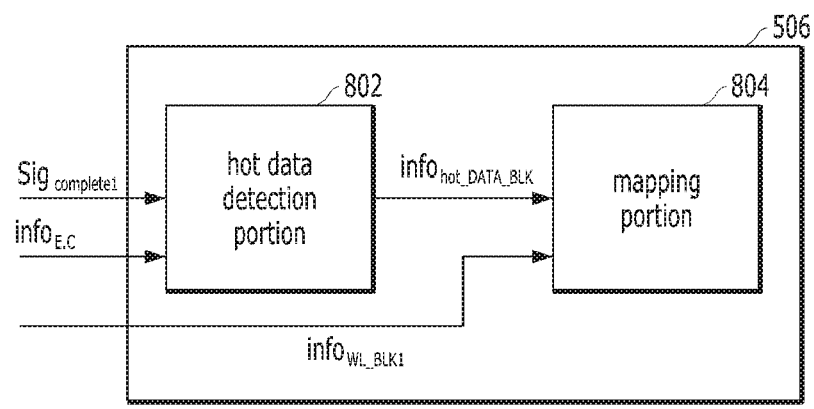
FIG. 10 is a block diagram schematically illustrating a wear-leveling operation module in accordance with an embodiment of the present disclosure.

FIG. 10 is a block diagram schematically illustrating the wear-leveling operation module 506 in accordance with an embodiment of the present disclosure.

The wear-leveling operation module 506 may include a hot data detection portion 802 and a mapping portion 804.

In accordance with an embodiment of the present disclosure, the hot data detection portion 802 may detect hot data memory blocks storing hot data according to the first complete signal $Sig_{complete1}$. The hot data detection portion 802 may detect as the hot data memory blocks the data memory blocks each having an erase count greater than or equal to a threshold, which may be predetermined, based on the erase count information $info_{EC}$. The hot data detection portion 802 may provide the mapping portion 804 with information $info_{hot\_DATA\_BLK}$ about the hot data memory blocks.

The mapping portion 804 may control the memory device 150 to perform a wear-leveling operation of mapping data stored in the hot data memory blocks to the first victim memory blocks according to the information $info_{hot\_DATA\_BLK}$ about the hot data memory blocks and the information $info_{WL\_BLK1}$ about the first victim memory blocks. After completion of the wear-leveling operation, the mapping portion 804 may control the memory device 150 to erase data stored in the hot data memory blocks and map cold data stored in the map memory blocks to the hot data memory blocks thereby delaying increase of the erase counts of the hot data memory blocks. Therefore, due to the wear-leveling operation, the rate or magnitude of increase of the erase counts of the first victim memory blocks each having a low erase count may be elevated while the rate or magnitude of increase of the erase counts of the hot data memory blocks each having a high erase count may be lowered. Therefore, overall erase counts of all memory blocks may be kept uniform.

Figure 11:
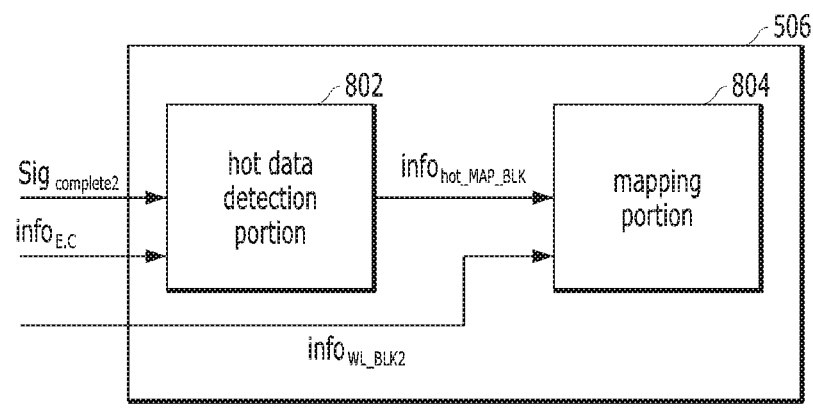
FIG. 11 is a block diagram schematically illustrating a wear-leveling operation module in accordance with another embodiment of the present disclosure.

FIG. 11 is a block diagram schematically illustrating the wear-leveling operation module 506 in accordance with another embodiment of the present disclosure.

The wear-leveling operation module 506 may include the hot data detection portion 802 and the mapping portion 804.

In accordance with another embodiment of the present disclosure, the hot data detection portion 802 may detect hot map memory blocks storing hot data according to the second complete signal $Sig_{complete2}$. The hot data detection portion 802 may detect as the hot map memory blocks the map memory blocks each having an erase count greater than or equal to a threshold, which may be predetermined, based on the erase count information $info_{EC}$. The hot data detection portion 802 may provide the mapping portion 804 with information $info_{hot\_MAP\_BLK}$ about the hot map memory blocks.

The mapping portion 804 may control the memory device 150 to perform a wear-leveling operation of mapping data stored in the hot map memory blocks to the second victim memory blocks according to the information $info_{hot\_MAP\_BLK}$ about the hot map memory blocks and the information $info_{WL\_BLK2}$ about the second victim memory blocks. After completion of the wear-leveling operation, the mapping portion 804 may control the memory device 150 to erase data stored in the hot map memory blocks and map cold data stored in the data memory blocks to the hot map memory blocks thereby delaying increase of the erase counts of the hot map memory blocks. Therefore, due to the wear-leveling operation, the rate or magnitude of increase of the erase counts of the second victim memory blocks each having a low erase count may be elevated while the rate or magnitude of increase of the erase counts of the hot map memory blocks each having a high erase count may be lowered. Therefore, overall erase counts of all memory blocks may be kept uniform.

Figure 12:
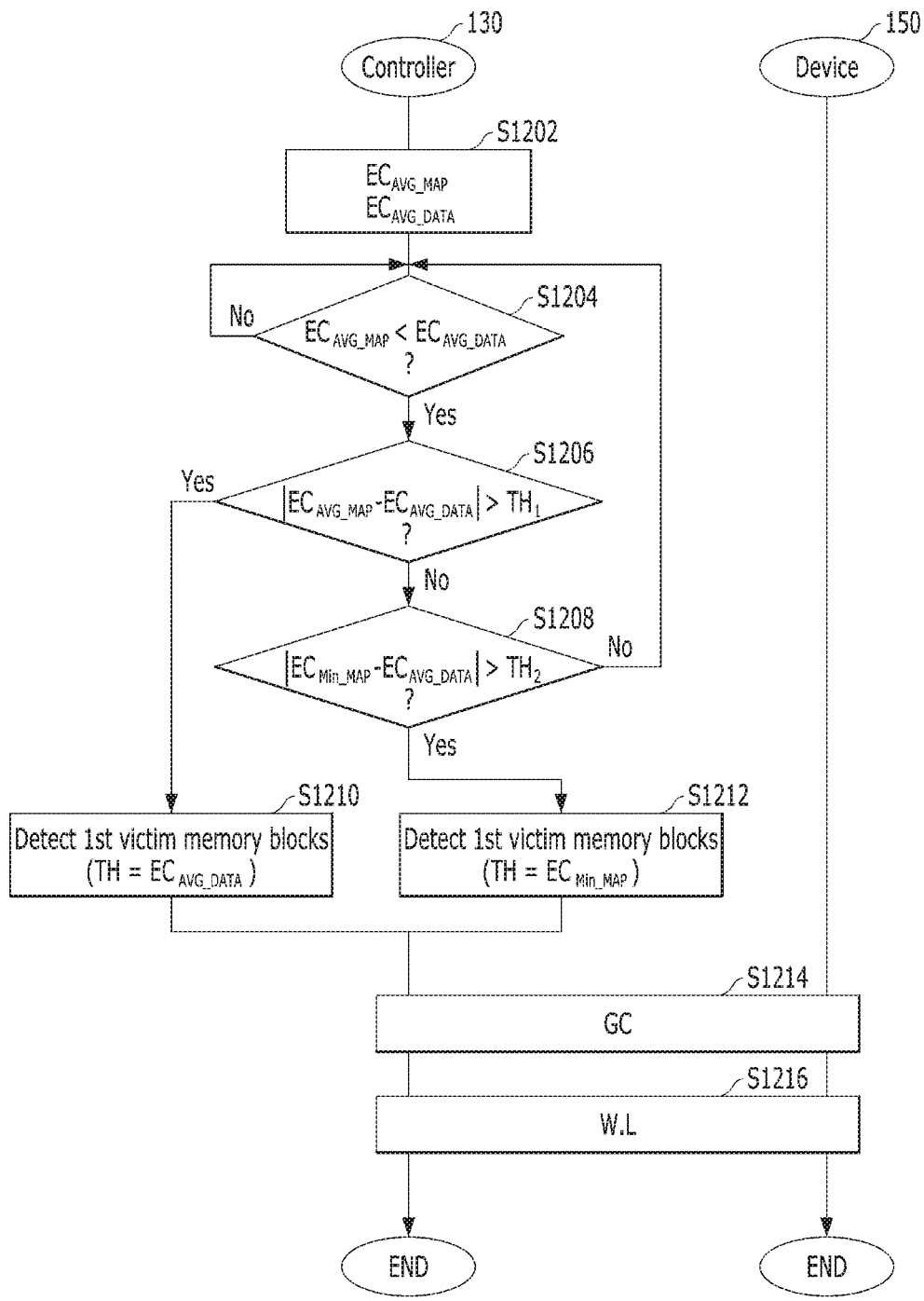
FIG. 12 is a flowchart illustrating an operation of the memory system in accordance with an embodiment of the present disclosure.

FIG. 12 is a flowchart illustrating an operation of the memory system 110 in accordance with an embodiment of the present disclosure.

Referring to FIG. 12, the operation of the memory system 110 may include step S1202 of counting an average erase count, steps S1204, S1206, S1208, S1210 and S1212 of detecting victim memory blocks, step S1214 of performing a garbage collection operation and step S1216 of performing a wear-leveling operation.

At step S1202, the controller 130 may obtain the average erase count $EC_{AVG\_MAP}$ of the map memory blocks and the average erase count $EC_{AVG\_DATA}$ of the data memory blocks. The controller 130 may obtain the average erase count $EC_{AVG\_MAP}$ of the map memory blocks by summing the erase counts of the respective map memory blocks within the memory device 150 and then dividing that sum by the number of the map memory blocks. The controller 130 may obtain the average erase count $EC_{AVG\_DATA}$ of the data memory blocks by summing the erase counts of the respective data memory blocks within the memory device 150 and then dividing that sum by the number of the data memory blocks.

At step S1204, the controller 130 may detect, based on the average erase count $EC_{AVG\_MAP}$ of the map memory blocks and the average erase count $EC_{AVG\_DATA}$ of the data memory blocks obtained at step S1202, the victim memory blocks when the average erase count $EC_{AVG\_MAP}$ of the map memory blocks is less than the average erase count $EC_{AVG\_DATA}$ of the data memory blocks ("Yes" at step S1204).

At step S1206, the controller 130 may compare, based on the average erase count $EC_{AVG\_MAP}$ of the map memory blocks and the average erase count $EC_{AVG\_DATA}$ of the data memory blocks obtained at step S1202, the difference between the average erase count $EC_{AVG\_MAP}$ of the map memory blocks and the average erase count $EC_{AVG\_DATA}$ of the data memory blocks with the first threshold $TH_1$. The controller 130 may obtain the minimum erase count $EC_{Min\_MAP}$ of the map memory blocks from the erase counts of the map memory blocks when the difference between the average erase count $EC_{AVG\_MAP}$ of the map memory blocks and the average erase count $EC_{AVG\_DATA}$ of the data memory blocks is less than or equal to the first threshold $TH_1$ ("No" at step S1206).

At step S1208, the controller 130 may compare, based on the average erase count $EC_{AVG\_MAP}$ of the map memory blocks and the average erase count $EC_{AVG\_DATA}$ of the data memory blocks obtained at step S1202 and the minimum erase count $EC_{Min\_MAP}$ of the map memory blocks obtained at step S1206, the difference between the minimum erase count $EC_{Min\_MAP}$ and the average erase count $EC_{AVG\_DATA}$ of the data memory blocks with the second threshold $TH_2$. When the difference between the minimum erase count $EC_{Min\_MAP}$ of the map memory blocks and the average erase count $EC_{AVG\_DATA}$ of the data memory blocks is less than or equal to the second threshold $TH_2$ ("No" at step S1208), the process may go back to step S1204.

At steps S1210 and S1212, the controller 130 may detect as the first victim memory blocks the map memory blocks each having the erase count less than or equal to the threshold TH.

At step S1210, the controller 130 may determine the average erase count $EC_{AVG\_DATA}$ of the data memory blocks as the threshold TH. When the difference between the average erase count $EC_{AVG\_MAP}$ of the map memory blocks and the average erase count $EC_{AVG\_DATA}$ of the data memory blocks is greater than the first threshold $TH_1$ ("Yes" at step S1206), the controller 130 may detect as the first victim memory blocks the map memory blocks each having an erase count less than or equal to the average erase count $EC_{AVG\_DATA}$ of the data memory blocks.

At step S1212, the controller 130 may determine the minimum erase count $EC_{Min\_MAP}$ of the map memory blocks as the threshold TH. When the difference between the minimum erase count $EC_{Min\_MAP}$ of the map memory blocks and the average erase count $EC_{AVG\_DATA}$ of the data memory blocks is less than the first threshold $TH_1$ but greater than the second threshold $TH_2$ ("Yes" at step S1208), the controller 130 may detect as the first victim memory block the map memory block having the minimum erase count $EC_{Min\_MAP}$ of the map memory blocks.

In accordance with an embodiment of the present disclosure, the controller 130 may control the memory device 150 to preferentially perform the wear-leveling operation on the map memory block having the minimum erase count $EC_{Min\_MAP}$ by triggering the wear-leveling operation under a particular condition (i.e., when the difference between the minimum erase count $EC_{Min\_MAP}$ of the map memory blocks and the average erase count $EC_{AVG\_DATA}$ of the data memory blocks is greater than a second threshold $TH_2$) even when the average erase count $EC_{AVG\_MAP}$ of the map memory blocks is less than the average erase count $EC_{AVG\_DATA}$ of the data memory blocks and the difference between the average erase count $EC_{AVG\_MAP}$ of the map memory blocks and the average erase count $EC_{AVG\_DATA}$ of the data memory blocks is less than or equal to the first threshold $TH_1$.

Therefore, the controller 130 may prevent a problem in which the wear-leveling operation is not performed for a long time on the map memory block having the minimum erase count $EC_{Min\_MAP}$ due to a long-time situation in which the average erase count $EC_{AVG\_MAP}$ of the map memory blocks is less than the average erase count $EC_{AVG\_DATA}$ of the data memory blocks and the difference between the average erase count $EC_{AVG\_MAP}$ of the map memory blocks and the average erase count $EC_{AVG\_DATA}$ of the data memory blocks is less than or equal to the first threshold $TH_1$.

At step S1214, the controller 130 may control the memory device 150 to perform a garbage collection operation on the first victim memory blocks detected at steps S1210 and S1212. During the garbage collection operation, the memory device 150 may copy valid page data of the first victim memory blocks into target map memory blocks and erase data of the first victim memory blocks.

At step S1216, the controller 130 may control the memory device 150 to perform a wear-leveling operation of mapping hot data stored in the data memory blocks to the first victim memory blocks. The hot data may be the one stored in the data memory blocks each having an erase count greater than or equal to a threshold, which may be predetermined.

For example, when the average erase count $EC_{AVG\_MAP}$ of the map memory blocks is '20', the average erase count $EC_{AVG\_DATA}$ of the data memory blocks is '100' and the first threshold $TH_1$ is '50', the average erase count $EC_{AVG\_MAP}$ of the map memory blocks is less than the average erase count $EC_{AVG\_DATA}$ of the data memory blocks and the difference between the average erase count $EC_{AVG\_MAP}$ of the map memory blocks and the average erase count $EC_{AVG\_DATA}$ of the data memory blocks is greater than the first threshold $TH_1$. Therefore, the controller 130 may detect as the first victim memory blocks the map memory blocks each having an erase count less than or equal to the average erase count $EC_{AVG\_DATA}$ of the data memory blocks. The controller 130 may control the memory device 150 to perform a garbage collection operation on the first victim memory blocks (i.e., the map memory blocks each having an erase count less than or equal to the average erase count $EC_{AVG\_DATA}$ of the data memory blocks). During the garbage collection operation, the memory device 150 may copy valid page data of the first victim memory blocks into target map memory blocks and erase data of the first victim memory blocks. The controller 130 may control the memory device 150 to perform a wear-leveling operation of mapping hot data stored in the hot data memory blocks, each of which has the erase count of '120', to the first victim memory blocks and mapping cold data stored in the cold map memory blocks, each of which has the erase count less than or equal to '10', to the hot data memory block.

For example, when the average erase count $EC_{AVG\_MAP}$ of the map memory blocks is '55', the average erase count $EC_{AVG\_DATA}$ of the data memory blocks is '100', the first threshold $TH_1$ is '50' and the second threshold $TH_2$ is '40', the average erase count $EC_{AVG\_MAP}$ of the map memory blocks is less than the average erase count $EC_{AVG\_DATA}$ of the data memory blocks and the difference between the average erase count $EC_{AVG\_MAP}$ of the map memory blocks and the average erase count $EC_{AVG\_DATA}$ of the data memory blocks is less than the first threshold $TH_1$ but greater than the second threshold $TH_2$. Therefore, the controller 130 may detect as the first victim memory block the map memory block having minimum erase count $EC_{Min\_MAP}$ of the map memory blocks and may control the memory device 150 to perform a wear-leveling operation on the first victim memory block (i.e., the map memory block having minimum erase count $EC_{Min\_MAP}$ of the map memory blocks).

In accordance with an embodiment of the present disclosure, the controller 130 may control the memory device 150 to perform a wear-leveling operation on the map memory block and the data memory block not separately but in the aggregate by changing the map memory block to the data memory block at steps S1214 and S1216. The controller 130 may prevent a problem in which the erase count of the map memory block does not increase by controlling the memory device 150 to perform a wear-leveling operation of mapping the hot data stored in the data memory block to the map memory block having a low erase count. Therefore, the erase counts of all the memory blocks may be kept uniform within the memory device 150.

Figure 13:
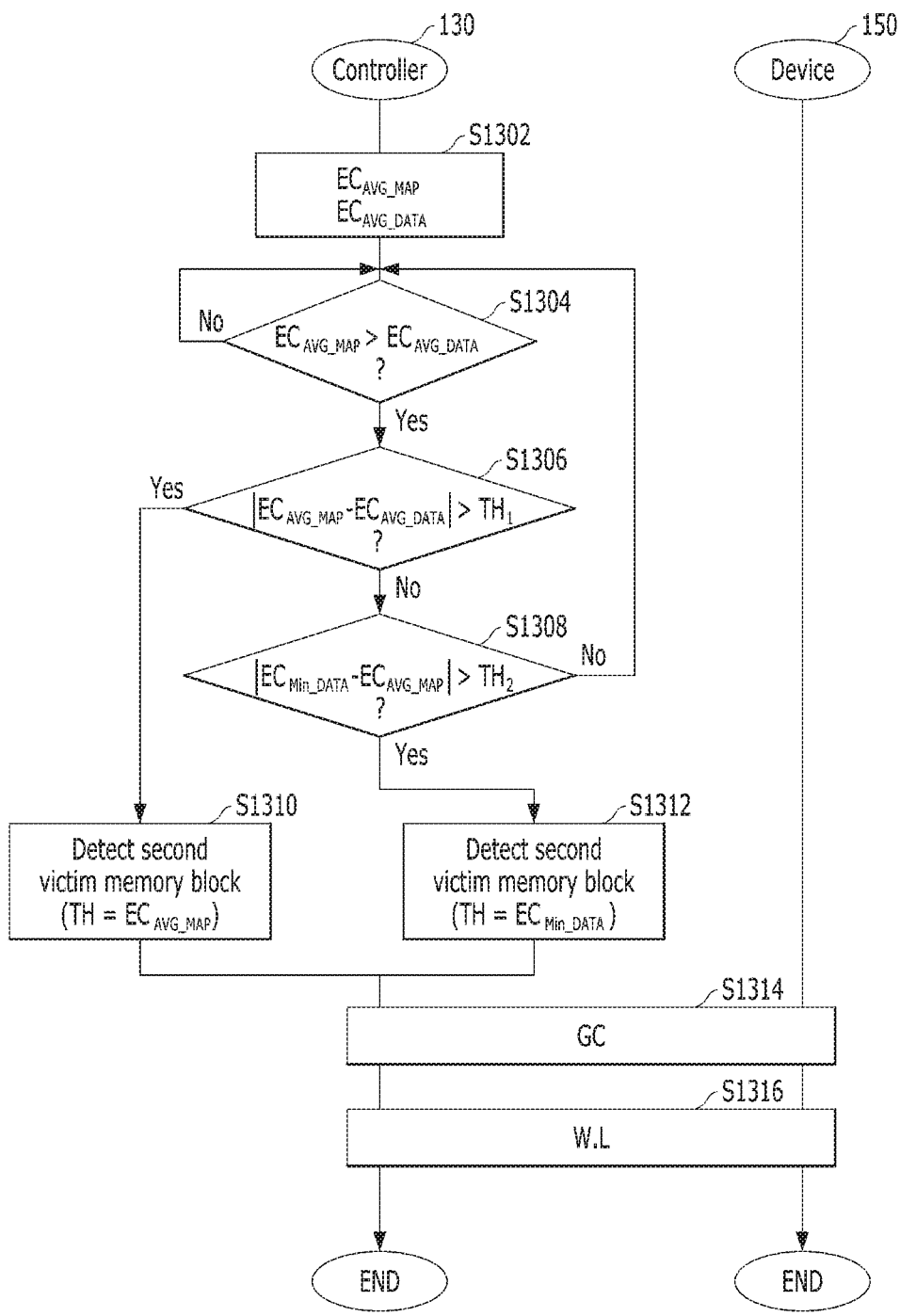
FIG. 13 is a flowchart illustrating an operation of the memory system in accordance with another embodiment of the present disclosure.

FIG. 13 is a flowchart schematically illustrating an operation of the memory system 110 in accordance with another embodiment of the present disclosure.

Referring to FIG. 13, the operation of the memory system 110 may include step S1302 of counting an average erase count, steps S1304 to S1312 of detecting victim memory blocks, step S1314 of performing a garbage collection operation and step S1316 of performing a wear-leveling operation.

At step S1302, the controller 130 may obtain the average erase count $EC_{AVG\_MAP}$ of the map memory blocks and the average erase count $EC_{AVG\_DATA}$ of the data memory blocks. The controller 130 may obtain the average erase count $EC_{AVG\_MAP}$ of the map memory blocks by summing the erase counts of the respective map memory blocks within the memory device 150 and then dividing that sum by the number of the map memory blocks within the memory device 150. The controller 130 may obtain the average erase count $EC_{AVG\_DATA}$ of the data memory blocks by summing the erase counts of the respective data memory blocks within the memory device 150 and then dividing that sum by the number of the data memory blocks within the memory device 150.

At step S1304, the controller 130 may detect, based on the average erase count $EC_{AVG\_MAP}$ of the map memory blocks and the average erase count $EC_{AVG\_DATA}$ of the data memory blocks obtained at step S1302, the victim memory blocks when the average erase count $EC_{AVG\_DATA}$ of the data memory blocks is less than the average erase count $EC_{AVG\_MAP}$ of the map memory blocks ("Yes" at step S1304).

At step S1306, the controller 130 may compare, based on the average erase count $EC_{AVG\_MAP}$ of the map memory blocks and the average erase count $EC_{AVG\_DATA}$ of the data memory blocks obtained at step S1302, the difference between the average erase count $EC_{AVG\_MAP}$ of the map memory blocks and the average erase count $EC_{AVG\_DATA}$ of the data memory blocks with the first threshold $TH_1$. The controller 130 may obtain the minimum erase count $EC_{Min\_DATA}$ of the data memory blocks from the erase counts of the data memory blocks when the difference between the average erase count $EC_{AVG\_MAP}$ of the map memory blocks and the average erase count $EC_{AVG\_DATA}$ of the data memory blocks is less than or equal to the first threshold $TH_1$ ("No" at step S1306).

At step S1308, the controller 130 may compare, based on the average erase count $EC_{AVG\_MAP}$ of the map memory blocks and the average erase count $EC_{AVG\_DATA}$ of the data memory blocks obtained at step S1302 and the minimum erase count $EC_{Min\_DATA}$ of the data memory blocks obtained at step S1306, the difference between the minimum erase count $EC_{Min\_DATA}$ of the data memory blocks and the average erase count $EC_{AVG\_MAP}$ of the map memory blocks with the second threshold $TH_2$. When the difference between the minimum erase count $EC_{Min\_DATA}$ of the data memory blocks and the average erase count $EC_{AVG\_MAP}$ of the map memory blocks is less than or equal to the second threshold $TH_2$ ("No" at step S1308), the process may go back to step S1304.

At steps S1310 and S1312, the controller 130 may detect as the second victim memory blocks the data memory blocks each having the erase count less than or equal to the threshold TH.

At step S1310, the controller 130 may determine the average erase count $EC_{AVG\_MAP}$ of the map memory blocks as the threshold TH. When the difference between the average erase count $EC_{AVG\_MAP}$ of the map memory blocks and the average erase count $EC_{AVG\_DATA}$ of the data memory blocks is greater than the first threshold $TH_1$ ("Yes" at step S1306), the controller 130 may detect as the second victim memory blocks the data memory blocks each having the erase count less than or equal to the average erase count $EC_{AVG\_MAP}$ of the map memory blocks.

At step S1312, the controller 130 may determine the minimum erase count $EC_{Min\_DATA}$ of the data memory blocks as the threshold TH. When the difference between the minimum erase count $EC_{Min\_DATA}$ of the data memory blocks and the average erase count $EC_{AVG\_MAP}$ of the map memory blocks is less than the first threshold $TH_1$ but greater than the second threshold $TH_2$ ("Yes" at step S1308), the controller 130 may detect as the second victim memory block the data memory block having the minimum erase count $EC_{Min\_DATA}$ of the data memory blocks.

In accordance with another embodiment of the present disclosure, the controller 130 may control the memory device 150 to preferentially perform the wear-leveling operation on the data memory block having the minimum erase count $EC_{Min\_DATA}$ by triggering the wear-leveling operation under the particular condition (i.e., when the difference between the minimum erase count $EC_{Min\_DATA}$ of the data memory blocks and the average erase count $EC_{AVG\_MAP}$ of the map memory blocks is greater than the second threshold $TH_2$) even when the average erase count $EC_{AVG\_DATA}$ of the data memory blocks is less than the average erase count $EC_{AVG\_MAP}$ of the map memory blocks and the difference between the average erase count $EC_{AVG\_MAP}$ of the map memory blocks and the average erase count $EC_{AVG\_DATA}$ of the data memory blocks is less than or equal to the first threshold $TH_1$.

Therefore, the controller 130 may prevent a problem in which the wear-leveling operation is not performed for a long time on the data memory block having the minimum erase count $EC_{Min\_DATA}$ due to a long-time situation in which the average erase count $EC_{AVG\_DATA}$ of the data memory blocks is less than the average erase count $EC_{AVG\_MAP}$ of the map memory blocks and the difference between the average erase count $EC_{AVG\_MAP}$ of the map memory blocks and the average erase count $EC_{AVG\_DATA}$ of the data memory blocks is less than or equal to the first threshold $TH_1$.

At step S1314, the controller 130 may control the memory device 150 to perform a garbage collection operation on the second victim memory blocks detected at steps S1310 and S1312. During the garbage collection operation, the memory device 150 may copy valid page data of the second victim memory blocks into target data memory blocks and erase data of the second victim memory blocks.

At step S1316, the controller 130 may control the memory device 150 to perform a wear-leveling operation of mapping hot data stored in the map memory blocks to the second victim memory blocks. The hot data may be stored in the map memory blocks each having an erase count greater than or equal to a threshold, which may be predetermined.

For example, when the average erase count $EC_{AVG\_DATA}$ of the data memory blocks is '20', the average erase count $EC_{AVG\_MAP}$ of the map memory blocks is '100' and the first threshold $TH_1$ is '50', the average erase count $EC_{AVG\_DATA}$ of the data memory blocks is less than the average erase count $EC_{AVG\_MAP}$ of the map memory blocks and the difference between the average erase count $EC_{AVG\_MAP}$ of the map memory blocks and the average erase count $EC_{AVG\_DATA}$ of the data memory blocks is greater than the first threshold $TH_1$. Therefore, the controller 130 may detect as the second victim memory blocks the data memory blocks each having an erase count less than or equal to the average erase count $EC_{AVG\_MAP}$ of the map memory blocks. The controller 130 may control the memory device 150 to perform a garbage collection operation on the second victim memory blocks (i.e., the data memory blocks each having the erase count less than or equal to the average erase count $EC_{AVG\_MAP}$ of the map memory blocks). During the garbage collection operation, the memory device 150 may copy valid page data of the second victim memory blocks into target data memory blocks and erase data of the second victim memory blocks. The controller 130 may control the memory device 150 to perform a wear-leveling operation of mapping hot data stored in the hot map memory blocks, each of which has an erase count of '120', to the second victim memory blocks and mapping cold data stored in the cold data memory blocks, each of which has an erase count less than or equal to '10' to the hot map memory block.

For example, when the average erase count $EC_{AVG\_DATA}$ of the data memory blocks is '55', the average erase count $EC_{AVG\_MAP}$ of the map memory blocks is '100', the first threshold $TH_1$ is '50' and the second threshold $TH_2$ is '40', the average erase count $EC_{AVG\_DATA}$ of the data memory blocks is less than the average erase count $EC_{AVG\_MAP}$ of the map memory blocks and the difference between the average erase count $EC_{AVG\_MAP}$ of the map memory blocks and the average erase count $EC_{AVG\_DATA}$ of the data memory blocks is less than the first threshold $TH_1$ but greater than the second threshold $TH_2$. Therefore, the controller 130 may detect as the second victim memory block the data memory block having minimum erase count $EC_{Min\_DATA}$ of the data memory blocks and may control the memory device 150 to perform a wear-leveling operation on the second victim memory block (i.e., the data memory block having minimum erase count $EC_{Min\_DATA}$ of the data memory blocks).

In accordance with another embodiment of the present disclosure, the controller 130 may control the memory device 150 to perform a wear-leveling operation on the map memory block and the data memory block not separately but in the aggregate by changing the data memory block to the map memory block at steps S1314 and S1316. The controller 130 may prevent a problem in which the erase count of the data memory block does not increase by controlling the memory device 150 to perform a wear-leveling operation of mapping the hot data stored in the map memory block to the data memory block having a low erase count. Therefore, the erase counts of all the memory blocks may be kept uniform within the memory device 150.

Below, a data processing system and electronic apparatuses, in which the memory system 110 including the controller 130 and the memory device 150 described above is implemented, are described with reference to FIGS. 14 to 22, in accordance with embodiments of the present disclosure.

Figure 14:
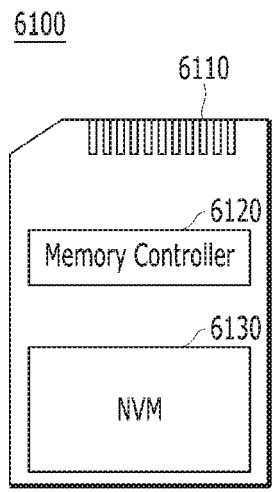
FIGS. 14 to 22 are diagrams schematically illustrating application examples of the data processing system in accordance with various embodiments of the present invention.

FIG. 14 is a diagram schematically illustrating another example of the data processing system including the memory system in accordance with an embodiment. FIG. 14 schematically illustrates a memory card system to which the memory system may be applied.

Referring to FIG. 14, the memory card system 6100 may include a memory controller 6120, a memory device 6130 and a connector 6110.

More specifically, the memory controller 6120 may be electrically connected to, and configured to access, the memory device 6130 embodied by a nonvolatile memory. For example, the memory controller 6120 may be configured to control read, write, erase and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processor, a host interface, a memory interface and an error correction component.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system may be applied to wired/wireless electronic devices, specifically mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device to form a solid-state driver (SSD). Also, the memory controller 6120 and the memory device 6130 may be so integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC), and/or a universal flash storage (UFS).

Figure 15:
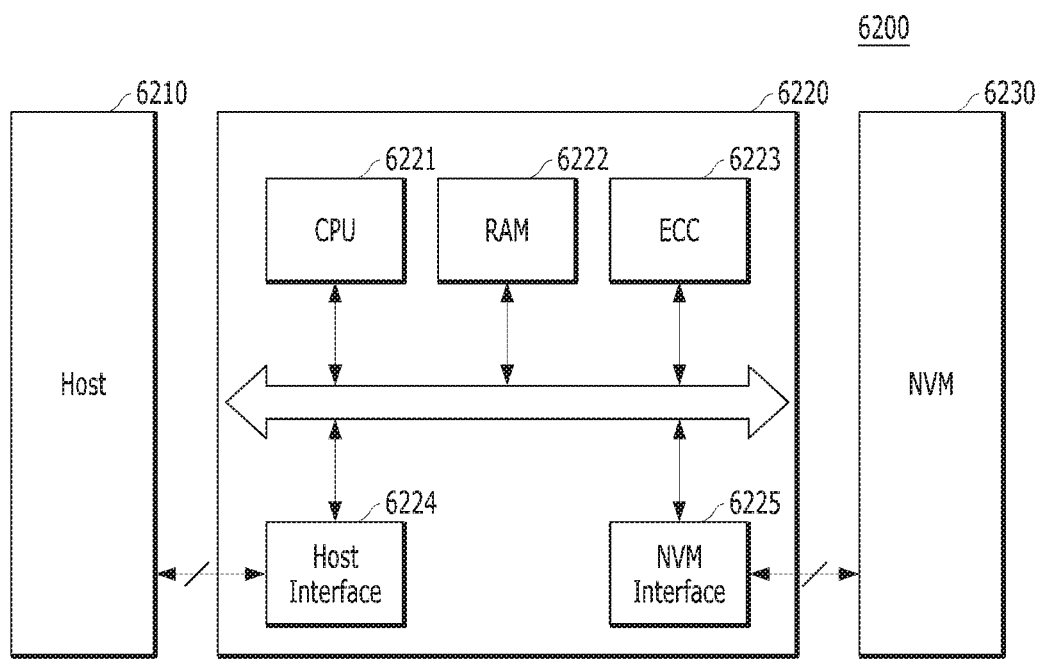

FIG. 15 is a diagram schematically illustrating another example of the data processing system including the memory system in accordance with an embodiment.

Referring to FIG. 15, the data processing system 6200 may include a memory device 6230 having one or more nonvolatile memories and a memory controller 6220 for controlling the memory device 6230. The data processing system 6200 illustrated in FIG. 15 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the memory device 6230 to operate at high speed.

The ECC circuit 6223 may generate an ECC (Error Correction Code) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224. The memory controller 6220 may exchange data with the memory device 6230 through the NVM interface 6225. The host interface 6224 may be connected to the host 6210 through a PATA bus, a SATA bus, a SCSI, an USB, a PCIe or a NAND interface. The memory controller 6220 may have a wireless communication function with a mobile communication protocol such as WiFi or Long Term Evolution (LTE). The memory controller 6220 may be connected to an external device, for example, the host 6210 or another external device, and then exchange data with the external device. In particular, as the memory controller 6220 is configured to communicate with the external device according to one or more of various communication protocols, the memory system and the data processing system may be applied to wired/wireless electronic devices, particularly a mobile electronic device.

Figure 16:
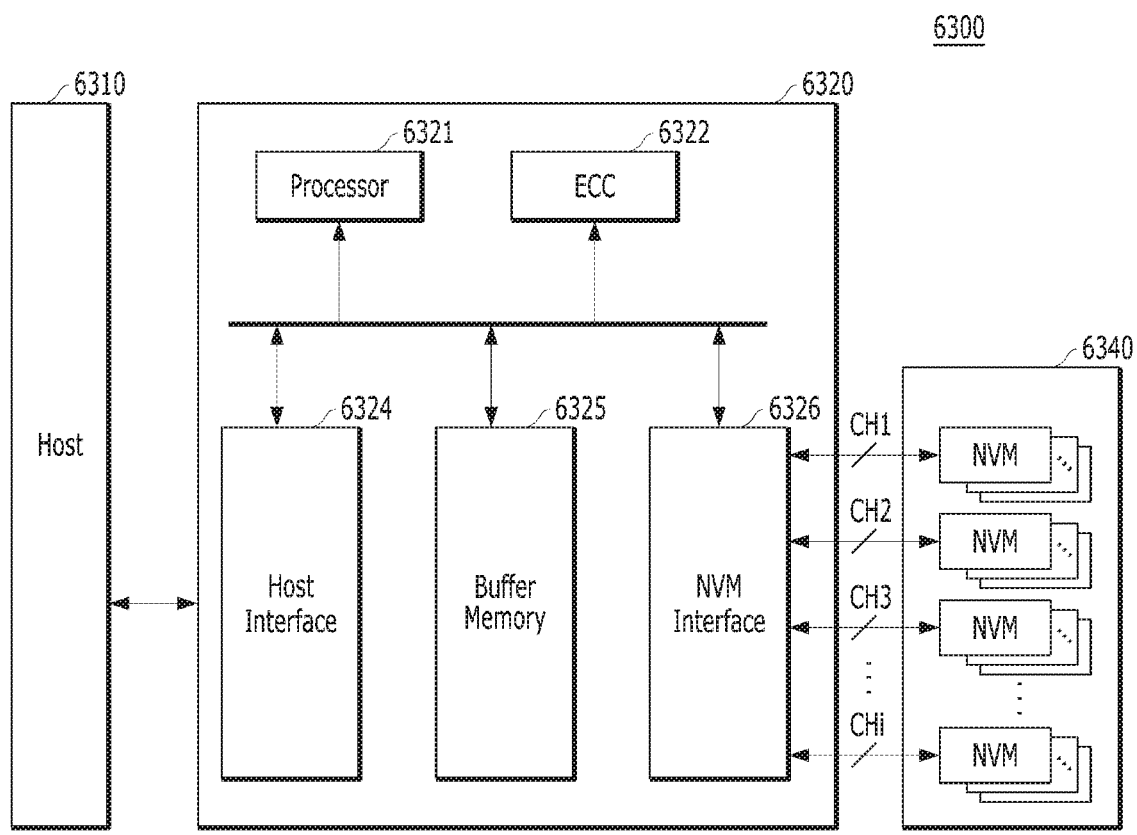

FIG. 16 is a diagram schematically illustrating another example of the data processing system including the memory system in accordance with an embodiment. FIG. 16 schematically illustrates an SSD to which the memory system may be applied.

Referring to FIG. 16, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a DRAM, a SDRAM, a DDR SDRAM, a LPDDR SDRAM and a GRAM or nonvolatile memories such as a FRAM, a ReRAM, a STT-MRAM and a PRAM. FIG. 12 illustrates that the buffer memory 6325 is embodied in the controller 6320. However, in another embodiment, the buffer memory 6325 may be external to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 may be provided to embody a data processing system, for example, a RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 17:
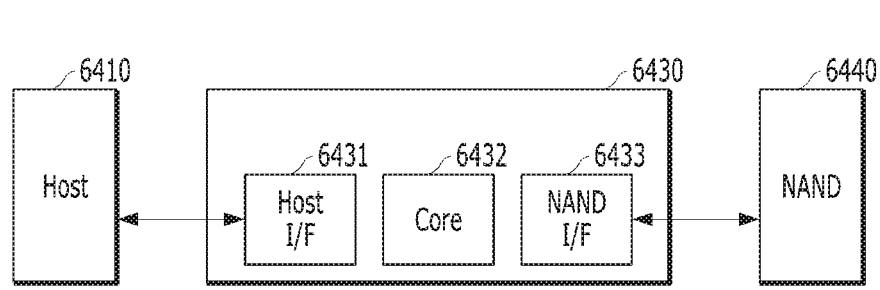

FIG. 17 is a diagram schematically illustrating another example of the data processing system including the memory system in accordance with an embodiment. FIG. 17 schematically illustrates an embedded Multi-Media Card (eMMC) to which the memory system may be applied.

Referring to FIG. 17, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 18 to 21 are diagrams schematically illustrating other examples of the data processing system including the memory system in accordance with embodiments. FIGS. 18 to 21 schematically illustrate UFS (Universal Flash Storage) systems to which the memory system may be applied.

Referring to FIGS. 18 to 21, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 15 to 17, and the UFS cards 6530, 6630, 6730, 6830 may be embodied in the form of the memory card system 6100 described with reference to FIG. 14.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through any of various protocols other than the UFS protocol, for example, an UFDs, a MMC, a SD, a mini-SD, and a micro-SD.

Figure 18:
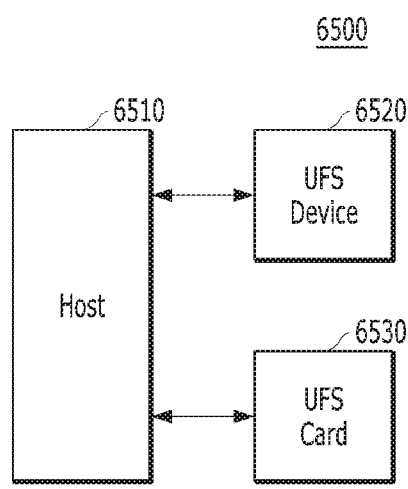

In the UFS system 6500 illustrated in FIG. 18, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, in another embodiment, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520 or connected in series or in the form of a chain to the UFS device 6520.

Figure 19:
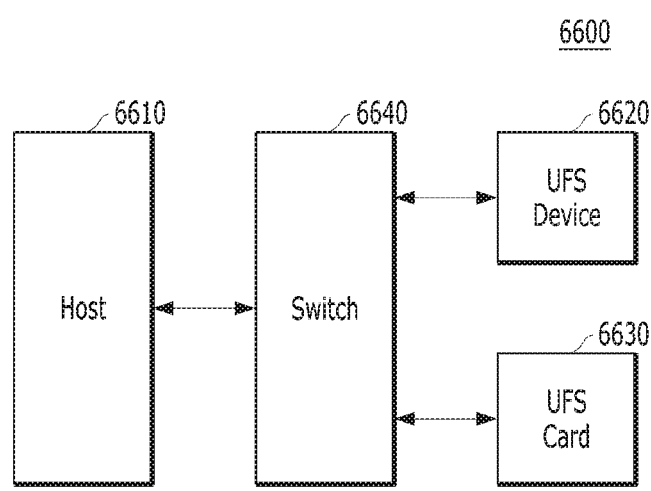

In the UFS system 6600 illustrated in FIG. 19, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, in another embodiment, a plurality of UFS devices and UFS cards may be connected in parallel or in the form of a star to the switching module 6640. A plurality of UFS cards may be connected in series or in the form of a chain to the UFS device 6620.

Figure 20:
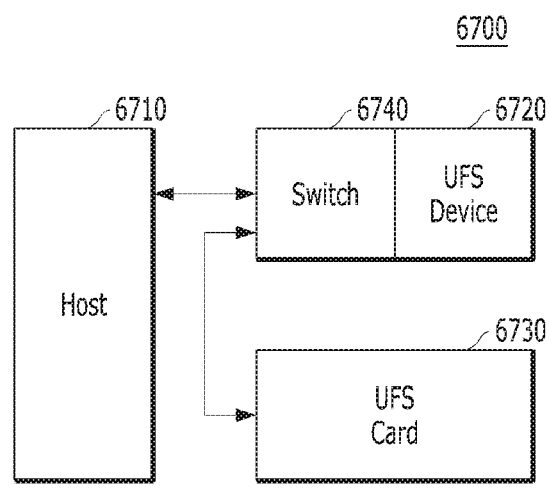

In the UFS system 6700 illustrated in FIG. 20, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, in another embodiment, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 21:
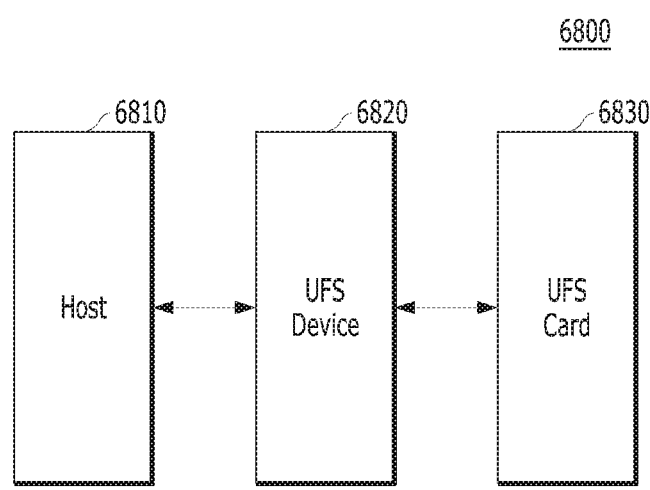

In the UFS system 6800 illustrated in FIG. 21, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, in another embodiment, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 22:
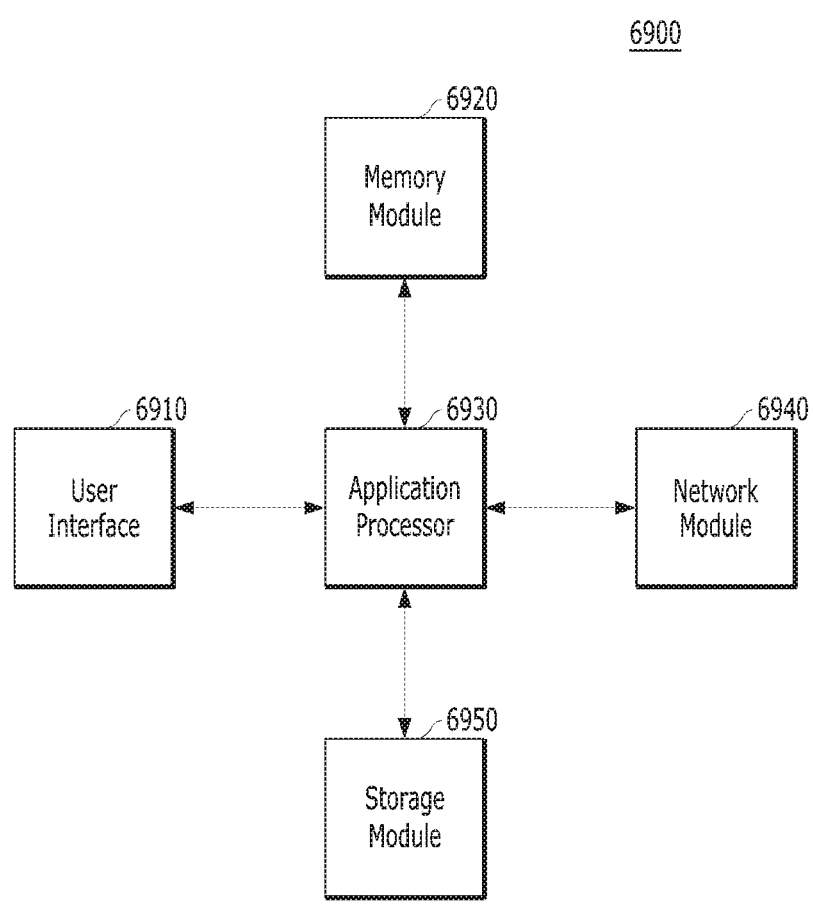

FIG. 22 is a diagram schematically illustrating another example of the data processing system including the memory system in accordance with an embodiment of the present invention. FIG. 22 is a diagram schematically illustrating a user system to which the memory system may be applied.

Referring to FIG. 22, the user system 6900 may include an application processor 6930, a memory module 6920, a network module 6940, a storage module 6950 and a user interface 6910.

More specifically, the application processor 6930 may drive components in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as a DRAM, a SDRAM, a DDR SDRAM, a DDR2 SDRAM, a DDR3 SDRAM, a LPDDR SDRAM, a LPDDR3 SDRAM or a LPDDR3 SDRAM or a nonvolatile RAM such as a PRAM, a ReRAM, a MRAM or a FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, an eMMC and an UFS as described above with reference to FIGS. 16 to 21.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

In accordance with embodiments of the present invention, the memory system may effectively perform a wear-leveling operation on a map memory block and a data memory block thereby improving a lifetime of a memory device.

While the present invention has been illustrated and described with respect to the specific embodiments, it will be apparent to those skilled in the art in light of the present disclosure that various changes and modifications may be made without departing from the spirit and scope of the disclosure as defined in the following claims.

What is claimed is:

1. A memory system comprising:
    a memory device including map memory blocks for storing map data and data memory blocks for storing host data or system data; and
    a controller configured to:
    control the memory device to perform a map block wear leveling operation on the map memory blocks;
    control the memory device to perform a data block wear leveling operation on the data memory blocks;
    detect, as first victim memory blocks, map memory blocks each having an erase count less than or equal to an average erase count of the data memory blocks when an average erase count of the map memory blocks is less than the average erase count of the data memory blocks and a difference between the average erase count of the map memory blocks and the average erase count of the data memory blocks is greater than a first threshold; and
    control the memory device to perform a first mutual wear leveling operation including:
        performing a garbage collection operation on the detected first victim memory blocks;
        mapping data stored in hot data memory blocks, among the data memory blocks, to the first victim memory blocks; and
        mapping data stored in cold map memory blocks, among the map memory blocks, to the hot data memory blocks.

2. The memory system of claim 1, wherein the controller is further configured to:
    detect, as second victim memory blocks, data memory blocks each having an erase count less than or equal to an average erase count of the map memory blocks when an average erase count of the data memory blocks is less than the average erase count of the map memory blocks and the difference between the average erase count of the map memory blocks and the average erase count of the data memory blocks is greater than the first threshold; and
    control the memory device to perform a second mutual wear leveling operation including:
        performing a garbage collection operation on the detected second victim memory blocks;
        mapping data stored in hot map memory blocks, among the map memory blocks, to the second victim memory blocks; and
        mapping data stored in cold data memory blocks, among the data memory blocks, to the hot map memory blocks.

3. The memory system of claim 2, wherein the controller further detects, among the second victim memory blocks, a data memory block having an minimum erase count when the average erase count of the data memory blocks is less than the average erase count of the map memory blocks and the difference between the average erase count of the map memory blocks and the average erase count of the data memory blocks is less than or equal to the first threshold and greater than a second threshold.

4. The memory system of claim 2, wherein the controller performs the garbage collection operation by copying valid data stored in the second victim memory blocks into target data memory blocks and erasing data stored in the second victim memory blocks.

5. The memory system of claim 2, wherein each of the hot map memory blocks has an erase count greater than a threshold.

6. The memory system of claim 2, wherein the cold data memory blocks are for storing cold data.

7. The memory system of claim 1, wherein the controller further detects, among the first victim memory blocks, a map memory block having a minimum erase count when the average erase count of the map memory blocks is less than the average erase count of the data memory blocks and the difference between the average erase count of the map memory blocks and the average erase count of the data memory blocks is less than or equal to the first threshold and greater than a second threshold.

8. The memory system of claim 1, wherein the controller performs the garbage collection operation by copying valid data stored in the first victim memory blocks into target map memory blocks and erasing data stored in the first victim memory blocks.

9. The memory system of claim 1, wherein each of the hot data memory blocks has an erase count greater than a threshold.

10. The memory system of claim 1, wherein the cold map memory blocks are for storing cold data.

11. An operating method of a memory system, the operating method comprising:
    performing a map block wear leveling operation on the map memory blocks;
    performing a data block wear leveling operation on the data memory blocks;
    detecting, as first victim memory blocks, map memory blocks each having an erase count less than or equal to an average erase count of data memory blocks when an average erase count of the map memory blocks is less than the average erase count of the data memory blocks and a difference between the average erase count of the map memory blocks and the average erase count of the data memory blocks is greater than a first threshold; and
    performing a first mutual wear leveling operation including:
        performing a garbage collection operation on the detected first victim memory blocks;
        mapping data stored in hot data memory blocks, among the data memory blocks, to the first victim memory blocks; and
        mapping data stored in cold map memory blocks, among the map memory blocks, to the hot data memory blocks.

12. The operating method of claim 11, further comprising:
    detecting, as second victim memory blocks, data memory blocks each having an erase count less than or equal to an average erase count of the map memory blocks when an average erase count of the data memory blocks is less than the average erase count of the map memory blocks and the difference between the average erase count of the map memory blocks and the average erase count of the data memory blocks is greater than the first threshold; and
    performing a second mutual wear leveling operation including:
        performing a garbage collection operation on the detected second victim memory blocks;
        mapping data stored in hot map memory blocks, among the map memory blocks, to the second victim memory blocks; and mapping data stored in cold data memory blocks, among the data memory blocks, to the hot map memory blocks.

13. The operating method of claim 12, further comprising detecting, among the second victim memory blocks, a data memory block having an minimum erase count when the average erase count of the data memory blocks is less than the average erase count of the map memory blocks and the difference between the average erase count of the map memory blocks and the average erase count of the data memory blocks is less than or equal to the first threshold and greater than a second threshold.

14. The operating method of claim 12, wherein the garbage collection operation includes copying valid data stored in the second victim memory blocks into target data memory blocks and erasing data stored in the second victim memory blocks.

15. The operating method of claim 12, wherein each of the hot map memory blocks has an erase count greater than a threshold.

16. The operating method of claim 11, further comprising detecting, among the first victim memory blocks, a map memory block having an minimum erase count when the average erase count of the map memory blocks is less than the average erase count of the data memory blocks and the difference between the average erase count of the map memory blocks and the average erase count of the data memory blocks is less than or equal to the first threshold and greater than a second threshold.

17. The operating method of claim 11, wherein the garbage collection operation includes copying valid data stored in the first victim memory blocks into target map memory blocks and erasing data stored in the first victim memory blocks.

18. The operating method of claim 11, wherein each of the hot data memory blocks has an erase count greater than a threshold.

19. The operating method of claim 11, wherein the cold map memory blocks are for storing cold data.

20. A memory system comprising:
  a memory device including first memory blocks and second memory blocks;
  a controller suitable for:
  controlling the memory device to perform a map block wear leveling operation on the map memory blocks;
  controlling the memory device to perform a data block wear leveling operation on the data memory blocks;
  selecting, when a first average erase count of the first memory blocks is less than a second average erase count of the second memory blocks by an amount greater than a first threshold, a memory block having an erase count less than or equal to the second average erase count as a victim memory block;
  selecting, when a first average erase count of the first memory blocks is less than a second erase count of the second memory blocks by an amount less than or equal to the first threshold and greater than a second threshold, a memory block having a minimum erase count as the victim memory block;
  controlling the memory device to perform a mutual wear leveling operation including:
    controlling the memory device to perform a garbage collection operation with the selected victim memory block; and
    controlling the memory device to map hot data stored in a third memory block among the second memory blocks to the victim memory block and map cold data stored in a fourth memory block among the first memory blocks to the third memory block.

* * * * *